(12) United States Patent
Cheung et al.

(10) Patent No.: US 12,238,395 B2
(45) Date of Patent: Feb. 25, 2025

(54) DYNAMIC TOPOLOGY GENERATION FOR BRANCHING NARRATIVES

(71) Applicant: NETFLIX, INC., Los Gatos, CA (US)

(72) Inventors: Maxine Cheung, Belmont, CA (US); Mark Watson, San Francisco, CA (US); Carla Christine Fisher, Los Gatos, CA (US); Kevin Pei-Wen Lee, San Jose, CA (US); Yves Raimond, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/343,695

(22) Filed: Jun. 28, 2023

(65) Prior Publication Data
US 2023/0345088 A1    Oct. 26, 2023

Related U.S. Application Data

(63) Continuation of application No. 17/514,573, filed on Oct. 29, 2021, now Pat. No. 11,696,002, which is a
(Continued)

(51) Int. Cl.
*H04N 21/8541* (2011.01)
*H04N 21/234* (2011.01)
(Continued)

(52) U.S. Cl.
CPC .......... *H04N 21/8541* (2013.01); *H04N 21/23406* (2013.01); *H04N 21/44222* (2013.01); *H04N 21/4758* (2013.01); *H04N 21/8545* (2013.01)

(58) Field of Classification Search
CPC ......... H04N 21/8541; H04N 21/23406; H04N 21/44222; H04N 21/4758; H04N 21/8545
See application file for complete search history.

(56) References Cited

U.S. PATENT DOCUMENTS

| | | |
|---|---|---|
| 2006/0064733 A1 | 3/2006 | Norton et al. |
| 2009/0187939 A1 | 7/2009 | Lajoie |
| | (Continued) | |

FOREIGN PATENT DOCUMENTS

| | | |
|---|---|---|
| BR | 112021001411 A2 | 4/2021 |
| BR | 112021001524 A2 | 4/2021 |
| | (Continued) | |

OTHER PUBLICATIONS

Notice of Allowance received for U.S. Appl. No. 17/524,731 dated Jul. 27, 2023, 8 pages.
(Continued)

*Primary Examiner* — Nathan J Flynn
*Assistant Examiner* — Christine A Kurien
(74) *Attorney, Agent, or Firm* — Artegis Law Group, LLP

(57) ABSTRACT

A playback application is configured to dynamically generate topology for an interactive media title. The playback application obtains an initial topology and also collects various data associated with a user interacting with the feature. The playback application then modifies the initial topology, based on the collected data, to generate a dynamic topology tailored to the user. The dynamic topology describes the set of choices available to the user during playback as well as which options can be selected by the user when making a given choice. In addition, the playback application also selectively buffers different portions of the interactive media title, based on the collected data, in anticipation of the user selecting particular options for available choices.

19 Claims, 16 Drawing Sheets

Related U.S. Application Data continuation of application No. 16/048,174, filed on Jul. 27, 2018, now Pat. No. 11,223,884.

(51) Int. Cl.
*H04N 21/442* (2011.01)
*H04N 21/475* (2011.01)
*H04N 21/8545* (2011.01)

(56) References Cited

U.S. PATENT DOCUMENTS

| | | |
|---|---|---|
| 2010/0131335 A1 | 5/2010 | Roh et al. |
| 2011/0194839 A1 | 8/2011 | Gebert et al. |
| 2011/0202562 A1 | 8/2011 | Bloch et al. |
| 2013/0094830 A1 | 4/2013 | Stone et al. |
| 2013/0254282 A1 | 9/2013 | Joy et al. |
| 2015/0156557 A1 | 6/2015 | Kang et al. |
| 2016/0077710 A1* | 3/2016 | Lewis .............. G06F 3/011 715/716 |
| 2016/0353145 A1 | 12/2016 | Ahlm et al. |
| 2016/0373795 A1* | 12/2016 | Stefanoski ......... H04N 21/8541 |
| 2017/0257671 A1 | 9/2017 | Yerli |
| 2017/0310723 A1* | 10/2017 | Furtwangler ........ H04L 65/762 |
| 2018/0008894 A1 | 1/2018 | Sack |
| 2018/0109819 A1 | 4/2018 | Lu et al. |
| 2019/0310867 A1 | 10/2019 | Edge et al. |
| 2019/0373330 A1 | 12/2019 | Bloch et al. |
| 2020/0037047 A1 | 1/2020 | Cheung et al. |
| 2020/0037048 A1 | 1/2020 | Cheung et al. |
| 2020/0243116 A1 | 7/2020 | Lee et al. |

FOREIGN PATENT DOCUMENTS

| | | |
|---|---|---|
| CA | 3 106 825 A1 | 1/2020 |
| CA | 3 106 982 A1 | 1/2020 |
| CA | 3 102 150 A1 | 8/2020 |
| EP | 2 712 206 A1 | 3/2014 |
| WO | 2006/039196 A2 | 4/2006 |
| WO | 2020/023315 A1 | 1/2020 |
| WO | 2020/023730 A1 | 1/2020 |
| WO | 2020/160341 A1 | 8/2020 |

OTHER PUBLICATIONS

Krishnamoorthi et al.,"Empowering the creative user", Future Human-Centric Multimedia Networking, Aug. 16, 2013, 6 pages.

Krishnamoorthi et al.,"Quality-adaptive Prefetching for Interactive Branched Video using HTTP-based Adaptive Streaming", Multimedia, ACM, Nov. 3, 2014, pp. 317-326.

Cragun et al.,"Improved Multimedia Response using Neural Net Prediction", Oct. 1, 1994, 3 pages.

Non Final Office Action received for U.S. Appl. No. 18/470,202 dated May 23, 2024, 16 pages.

Final Office Action received for U.S. Appl. No. 18/470,202 dated Oct. 16, 2024, 30 pages.

* cited by examiner

DYNAMIC TOPOLOGY GENERATION FOR BRANCHING NARRATIVES

CROSS-REFERENCE TO RELATED APPLICATIONS

This application is a continuation of the co-pending U.S. patent application titled, "DYNAMIC TOPOLOGY GENERATION FOR BRANCHING NARRATIVES," filed on Oct. 29, 2021, and having Ser. No. 17/514,573, which is a continuation of U.S. patent application titled, "DYNAMIC TOPOLOGY GENERATION FOR BRANCHING NARRATIVES," filed on Jul. 27, 2018, and having Ser. No. 16/048,174, issued as U.S. Pat. No. 11,223,884. The subject matter of these related applications is hereby incorporated herein by reference.

BACKGROUND

Field of the Various Embodiments

The present invention relates generally to computer science and, more specifically, to dynamic topology generation for branching narratives.

Description of the Related Art

A video streaming service provides a user with access to a library of media titles. The user connects to the video streaming service using an endpoint device, such as a laptop computer, a smart television, or a tablet computer, among others. The endpoint device generates a graphical user interface (GUI) that allows the user to make selections from the library of media titles. Upon selecting a given media title, the video streaming service streams media content associated with the media title to the endpoint device. The media content generally includes frames of video and/or audio encoded with specific encoding settings that may vary based on network conditions, user preferences, and other parameters.

A given media title may fall into a variety of different format categories, including feature-length films, episodic serials, documentary features, and so forth. Media titles may also be classified based on thematic content and could therefore be classified, for example, as "action," "romance," "comedy," and so forth. In any of these cases, a given media title usually conveys a story of some kind using a linear or non-linear narrative. A linear narrative generally tells a story by describing a set of sequentially occurring events; whereas, a non-linear narrative typically tells a story by describing a non-sequential set of events. Regardless of format category, thematic content, and narrative type, from a data perspective, most media titles have been organized historically as a single, defined sequence of video and/or audio frames, where different frames may be encoded with varying settings.

More recently, some video streaming services have started providing users with access to "interactive" media titles that allow users to make various choices during playback that affect how the stories being told in the interactive media titles unfold. For example, an interactive media title could ask a user to choose the specific clothing a character in the story should wear. Then, subsequent portions of the interactive media title would depict the character wearing the user-selected clothing. Because the storyline of an interactive media title typically changes or "branches" based on the different choices made by the user during playback, interactive media titles may be described as employing a "branching" narrative.

From a data perspective, an interactive media title adheres to a structure that is fundamentally different compared to the more historical structure described above. In that regard, the structure associated with a typical interactive media title defines the particular choices the user is allowed to make at various points in time during playback as well as what media content is played back to the user in response to each particular choice. Accordingly, the structure of a given interactive media title may define numerous possible story arcs, each potentially having a unique ending.

One problem associated with conventional interactive media titles is that the structure of any given interactive media title is generated independently of the specific users who engage with that interactive media title. This "one size fits all" approach does not specifically address the particular interests and preferences of all users, which can dissuade some users from engaging with the interactive media title. In addition, the structure of a given interactive media title is typically fixed. Consequently, that structure cannot be adapted or customized to suit different users.

Another problem that can arise when streaming an interactive media title is that the endpoint device is not able to efficiently buffer or otherwise process the media content associated with the un-played portions of the interactive media title because the choice of media content is unknown to the system until the user actually chooses a particular branch to follow in the interactive media title. In practice, video streaming services have attempted to address this problem by trying to buffer all content associated with each possible choice associated with an un-played portion of the interactive media title. However, this approach can be wasteful because media content associated with branches that are never chosen by the user is nevertheless buffered, thereby needlessly consuming network and local computing resources, including, without limitation, network bandwidth and processing and memory resources on the local machine(s), among others.

As the foregoing illustrates, what is needed in the art are more effective techniques for implementing branching narratives as part of a streaming service.

SUMMARY

Various embodiments include a computer-implemented method, comprising identifying a first choice point included in a first topology of an interactive media title, wherein the first topology indicates a first plurality of segments of the interactive media title that can be played in response to one or more user selections made in conjunction with the first choice point, generating first user data associated with a first set of users who have accessed the interactive media title, generating a separate set of buffering parameters for each segment included in the first plurality of segments based on the first user data, at least partially buffering two or more segments included in the first plurality of segments based on the separate sets of buffering parameters associated with the two or more segments, and transmitting a buffered portion of a first segment included in the two or more segments to an output device in response to a first user selection made by the first user in conjunction with the first choice point.

One advantage of the techniques described herein is that the structure of the interactive media title can be customized for the user based on data associated with the user and data associated with other users. Accordingly, this approach provides a more engaging and enjoyable experience to the user. Another advantage of the disclosed techniques is that various network and device resources are efficiently allocated for streaming, buffering, and/or processing different quality versions of the interactive media title based on predictions of user choices. Those resources may include network bandwidth, endpoint device memory, and any other resource involved with streaming the interactive media title. Accordingly, the disclosed techniques provide multiple technological advancements over the prior art.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
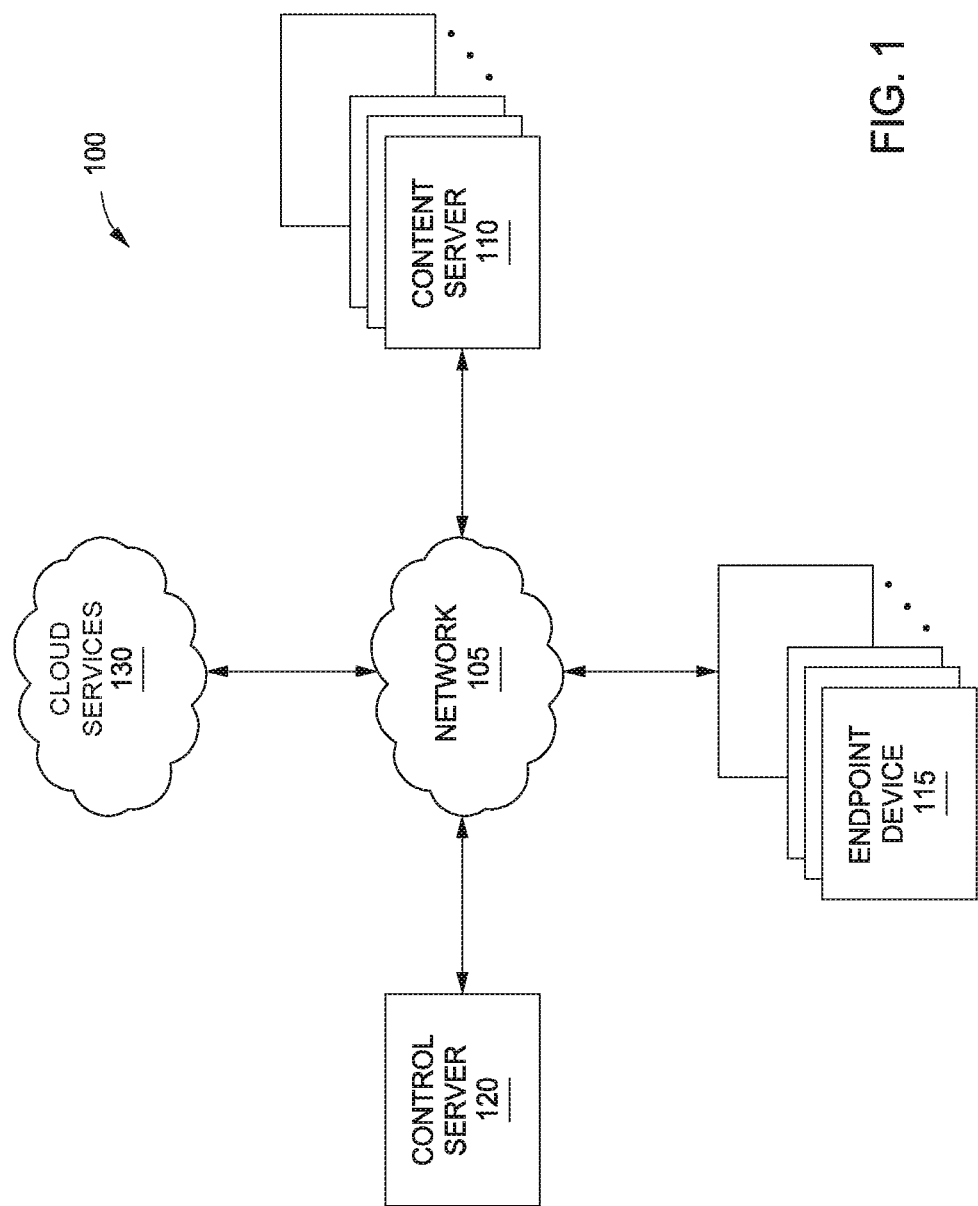
FIG. 1 illustrates a network infrastructure configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

A video streaming service may provide users with access to various types of media titles. Typical media titles require minimal user input and are meant to be viewed in a relatively passive manner. Interactive media titles, by contrast, are designed to be interactive and to actively engage the user in making choices that affect the story being told. Because interactive media titles provide an alternative avenue for engaging particular types of users who are more interested in active participation, the generation and delivery of interactive media titles represents an important cornerstone in the ongoing effort to attract a growing user base. However, the process of generating and delivering engaging interactive media titles poses specific challenges.

As noted above, a conventional interactive media title has an underlying structure that is generated independently of the particular interests and preferences of target users. Further, that underlying structure is typically fixed and therefore cannot be modified or otherwise adapted to be more relevant to any specific user. Consequently, some users may find specific interactive titles to be boring or irrelevant. These restrictions also limit the creative freedom of content creators. What would be useful is an approach for dynamically adapting the underlying structure of a given interactive media title in order to provide users with personally engaging sets of choices and content.

Another problem associated with streaming interactive media titles is that typical approaches to buffering media content cannot be applied because the specific media content that should be buffered depends on choices made by the user. For example, the user could be presented with a choice between first and second alternate story arcs that would be conveyed, respectively, using media segments A and B. When the user chooses the first story arc, media segment A would be streamed to the user. When the user chooses the second story arc, media segment B would be streamed to the user. In such a situation, only one of media segments A and B needs to be buffered and streamed. However, since it is unknown which segment is needed until after the user makes the choice, both segments are typically buffered in order to prepare for either scenario. This approach wastes network and device resources and can diminish the user experience when rebuffering is required. Accordingly, what would be useful is an approach for predictively buffering media segments in a manner that optimizes network and device resource utilization.

To address the above issues, embodiments of the invention include a playback application configured to dynamically generate topology for an interactive media title. The playback application obtains an initial topology and also collects various data associated with a user interacting with the feature. The playback application then modifies the initial topology, based on the collected data, to generate a dynamic topology tailored to the user. The dynamic topology describes the set of decisions available to the user during playback as well as which options can be selected by the user when making a given decision. The playback application can also, based on one or more rules, suppress a given set of decisions that are predicted to be less relevant to the user to allow the user to be seamlessly redirected along a more relevant path of the topology. In addition, the playback application selectively buffers different portions of the interactive media title, based on the collected data, in anticipation of the user selecting particular options for available decisions.

One advantage of the techniques described herein is that the interactive media title presents customized decisions and corresponding sets of options to different users, thereby providing a personalized viewing experience which may be more engaging to users compared to conventional "one size fits all" approaches. This approach may also provide content creators with more creative freedom when generating interactive media titles. Another advantage of the disclosed techniques is that network and/or device resources, including bandwidth and memory, among others, can be efficiently allocated for streaming, buffering, and/or processing portions of the interactive media title that are more likely to be selected. Accordingly, the disclosed techniques provide multiple technological advancements over the prior art.

System Overview

FIG. 1 illustrates a network infrastructure configured to implement one or more aspects of the various embodiments. As shown, network infrastructure 100 includes content servers 110, control server 120, and endpoint devices 115, each of which are connected via a communications network 105. Network infrastructure 100 is generally used to distribute content to content servers 110 and endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with control server 120 to determine the location and availability of various files that are tracked and managed by control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from content server 110 or via a broader content distribution network. In some embodiments, content servers 110 enable users to authenticate (e.g., using a username and password) in order to access files stored on content servers 110. Although only a single control server 120 is shown in FIG. 1, in various embodiments multiple control servers 120 may be implemented to track and manage files.

In various embodiments, cloud services 130 may include an online storage service (e.g., Amazon® Simple Storage Service, Google® Cloud Storage, etc.) in which a catalog of files, including thousands or millions of files, is stored and accessed in order to fill content servers 110. Cloud services 130 also may provide compute or other processing services. Although only a single cloud services 130 is shown in FIG. 1, in various embodiments multiple cloud services 130 may be implemented.

Figure 2:
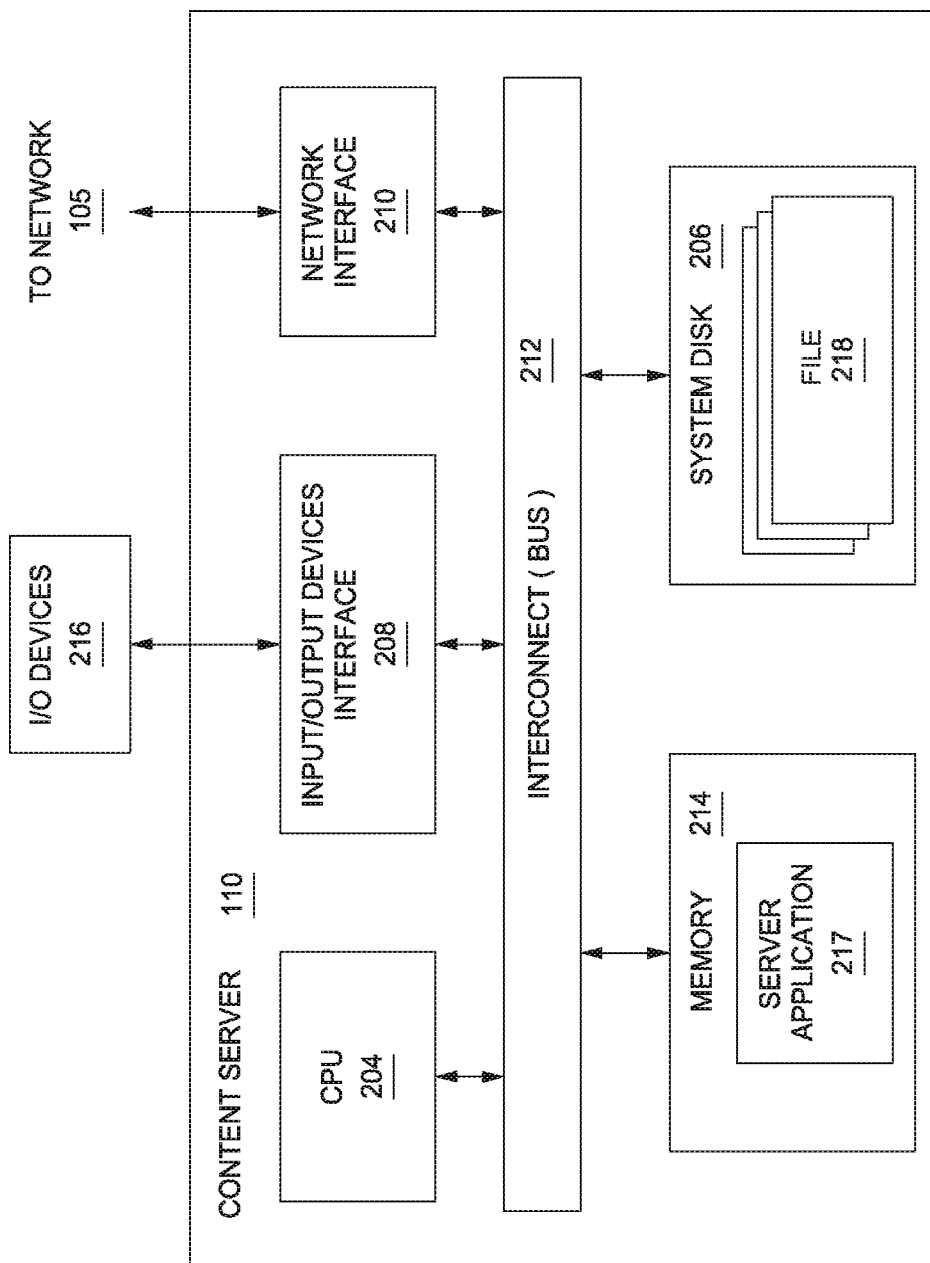
FIG. 2 is a block diagram of a content server that may be implemented in conjunction with the network infrastructure of FIG. 1, according to various embodiments.

FIG. 2 is a block diagram of a content server that may be implemented in conjunction with the network infrastructure of FIG. 1, according to various embodiments. As shown, content server 110 includes, without limitation, a central processing unit (CPU) 204, a system disk 206, an input/output (I/O) devices interface 208, a network interface 210, an interconnect 212, and a system memory 214.

CPU 204 is configured to retrieve and execute programming instructions, such as server application 217, stored in system memory 214. Similarly, CPU 204 is configured to store application data (e.g., software libraries) and retrieve application data from the system memory 214. Interconnect 212 is configured to facilitate transmission of data, such as programming instructions and application data, between CPU 204, system disk 206, I/O devices interface 208, network interface 210, and system memory 214. I/O devices interface 208 is configured to receive input data from I/O devices 216 and transmit the input data to CPU 204 via interconnect 212. For example, I/O devices 216 may include one or more buttons, a keyboard, a mouse, and/or other input devices. I/O devices interface 208 is further configured to receive output data from CPU 204 via interconnect 212 and transmit the output data to I/O devices 216.

System disk 206 may include one or more hard disk drives, solid state storage devices, or similar storage devices. System disk 206 is configured to store non-volatile data such as files 218 (e.g., audio files, video files, subtitles, application files, software libraries, etc.). Files 218 can then be retrieved by one or more endpoint devices 115 via network 105. In some embodiments, network interface 210 is configured to operate in compliance with the Ethernet standard.

System memory 214 includes a server application 217 configured to service requests for files 218 received from endpoint device 115 and other content servers 110. When server application 217 receives a request for a file 218, server application 217 retrieves corresponding file 218 from system disk 206 and transmits the file 218 to an endpoint device 115 or a content server 110 via network 105. Files 218 include a plurality of digital visual content items, such as videos and still images. In addition, files 218 may include metadata associated with such visual content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

Figure 3:
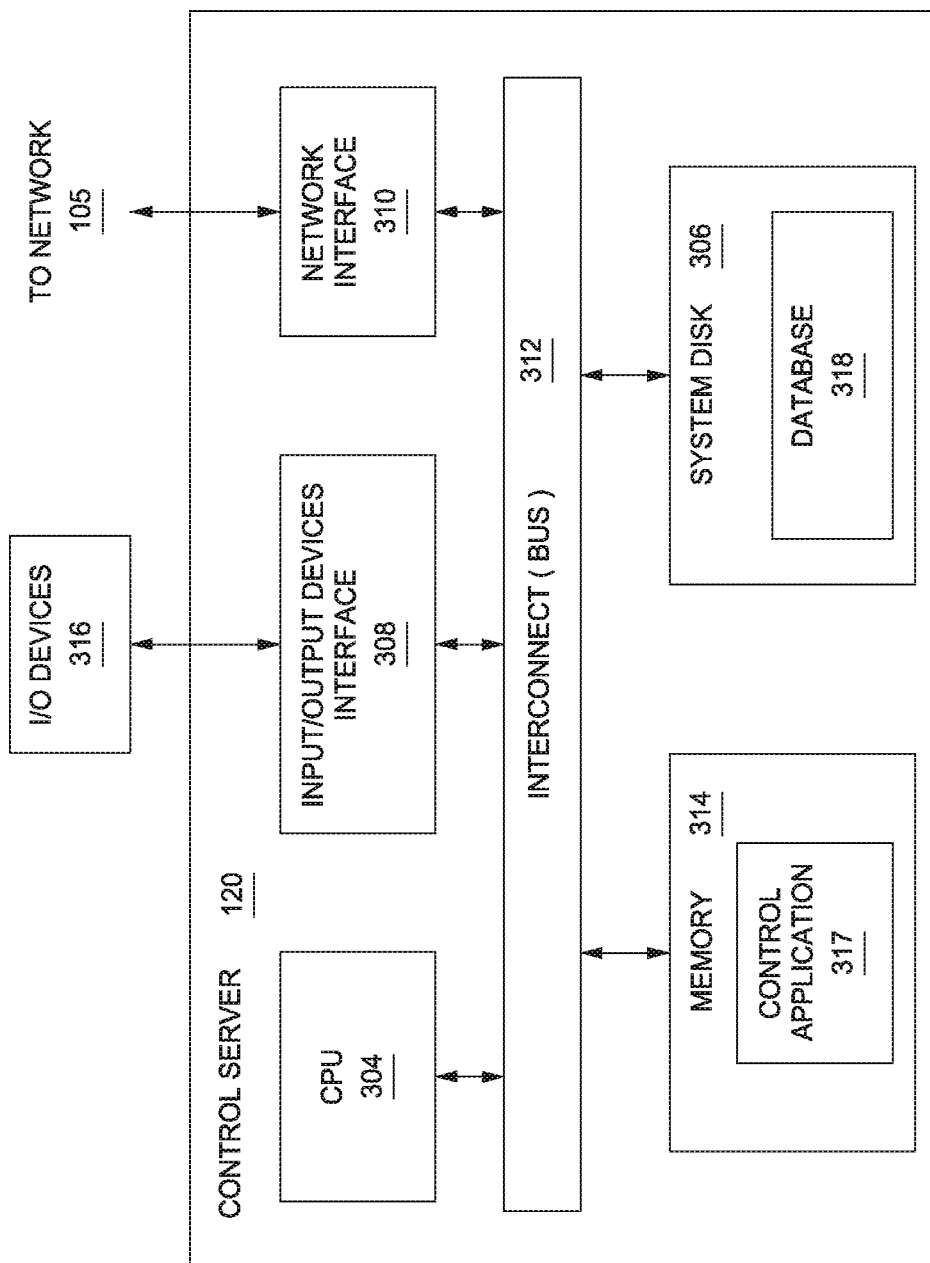
FIG. 3 is a block diagram of a control server that may be implemented in conjunction with the network infrastructure of FIG. 1, according to various embodiments.

FIG. 3 is a block diagram of a control server 120 that may be implemented in conjunction with the network infrastructure 100 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

CPU 304 is configured to retrieve and execute programming instructions, such as control application 317, stored in system memory 314. Similarly, CPU 304 is configured to store application data (e.g., software libraries) and retrieve application data from system memory 314 and a database 318 stored in system disk 306. Interconnect 312 is configured to facilitate transmission of data between CPU 304, system disk 306, I/O devices interface 308, network interface 310, and system memory 314. I/O devices interface 308 is configured to transmit input data and output data between I/O devices 316 and CPU 304 via interconnect 312. System disk 306 may include one or more hard disk drives, solid state storage devices, and the like. System disk 206 is configured to store a database 318 of information associated with content servers 110, cloud services 130, and files 218.

System memory 314 includes a control application 317 configured to access information stored in database 318 and process the information to determine the manner in which specific files 218 will be replicated across content servers 110 included in the network infrastructure 100. Control application 317 may further be configured to receive and analyze performance characteristics associated with one or more of content servers 110 and/or endpoint devices 115. As noted above, in some embodiments, metadata associated with such visual content items, and/or user/subscriber data may be stored in database 318 rather than in files 218 stored in content servers 110.

Figure 4:
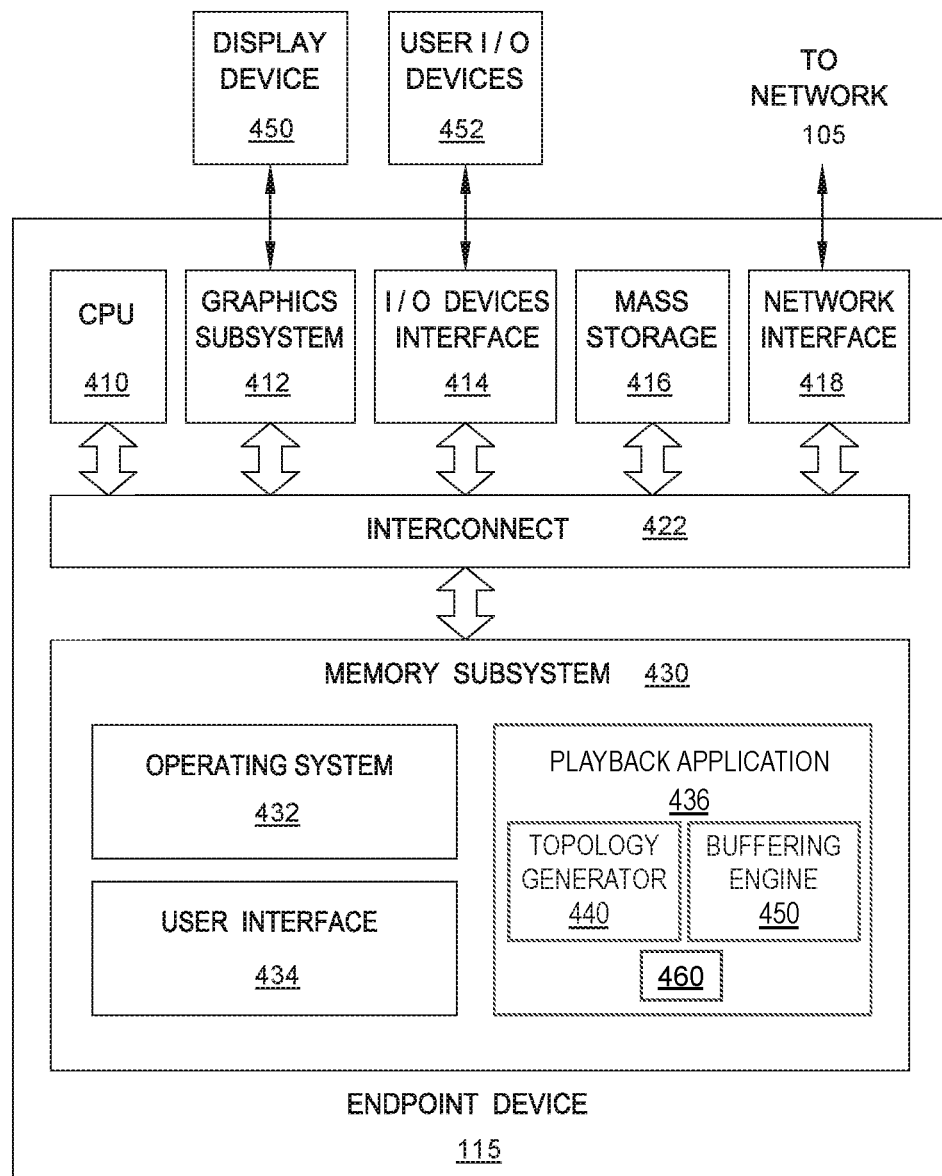
FIG. 4 is a block diagram of an endpoint device that may be implemented in conjunction with the network infrastructure of FIG. 1, according to various embodiments.

FIG. 4 is a block diagram of an endpoint device that may be implemented in conjunction with the network infrastructure of FIG. 1, according to various embodiments. As shown, endpoint device 115 may include, without limitation, a CPU 410, a graphics subsystem 412, an I/O device interface 414, a mass storage unit 416, a network interface 418, an interconnect 422, and a memory subsystem 430.

In some embodiments, CPU 410 is configured to retrieve and execute programming instructions stored in memory subsystem 430. Similarly, CPU 410 is configured to store and retrieve application data (e.g., software libraries) residing in memory subsystem 430. Interconnect 422 is configured to facilitate transmission of data, such as programming instructions and application data, between CPU 410, graphics subsystem 412, I/O devices interface 414, mass storage 416, network interface 418, and memory subsystem 430.

In some embodiments, graphics subsystem 412 is configured to generate frames of video data and transmit the frames of video data to display device 450. In some embodiments, graphics subsystem 412 may be integrated into an integrated circuit, along with CPU 410. Display device 450 may comprise any technically feasible means for generating an image for display. For example, display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to CPU 410 via interconnect 422. For example, user I/O devices 452 may comprise one of more buttons, a keyboard, and a mouse or other pointing device. I/O device interface 414 also includes an audio output unit configured to generate an electrical audio output signal. User I/O devices 452 includes a speaker configured to generate an acoustic output in response to the electrical audio output signal. In alternative embodiments, display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via network 105. In some embodiments, network interface 418 is configured to communicate using the well-known Ethernet standard. Network interface 418 is coupled to CPU 410 via interconnect 422.

In some embodiments, memory subsystem 430 includes programming instructions and application data that comprise an operating system 432, a user interface 434, and a playback application 436. Operating system 432 performs system management functions such as managing hardware devices including network interface 418, mass storage unit 416, I/O device interface 414, and graphics subsystem 412. Operating system 432 also provides process and memory management models for user interface 434 and playback application 436. User interface 434, such as a window and object metaphor, provides a mechanism for user interaction with endpoint device 108. Persons skilled in the art will recognize the various operating systems and user interfaces that are well-known in the art and suitable for incorporation into endpoint device 108.

In some embodiments, playback application 436 is configured to request and receive content from content server 105 via network interface 418. Further, playback application 436 is configured to interpret the content and present the content via display device 450 and/or user I/O devices 452. This content may be associated with an interactive media title that allows users to make decisions regarding how a story unfolds.

Playback application 436 includes a topology generator 440, a buffering engine 450, and an interactive media title 460. Interactive media title 460 includes a topology defining the underlying branching structure of interactive media title 460 and metadata associated with that structure. Topology generator 440 is configured to dynamically generate and modify the topology based on various data sets. Buffering engine 450 is configured to buffer media content associated with different portions of interactive media title 460. Various techniques implemented by playback application 436 when playing interactive media title 460 are described in greater detail below in conjunction with FIGS. 5-12.

Topology of an Interactive Media Title

Figure 5:
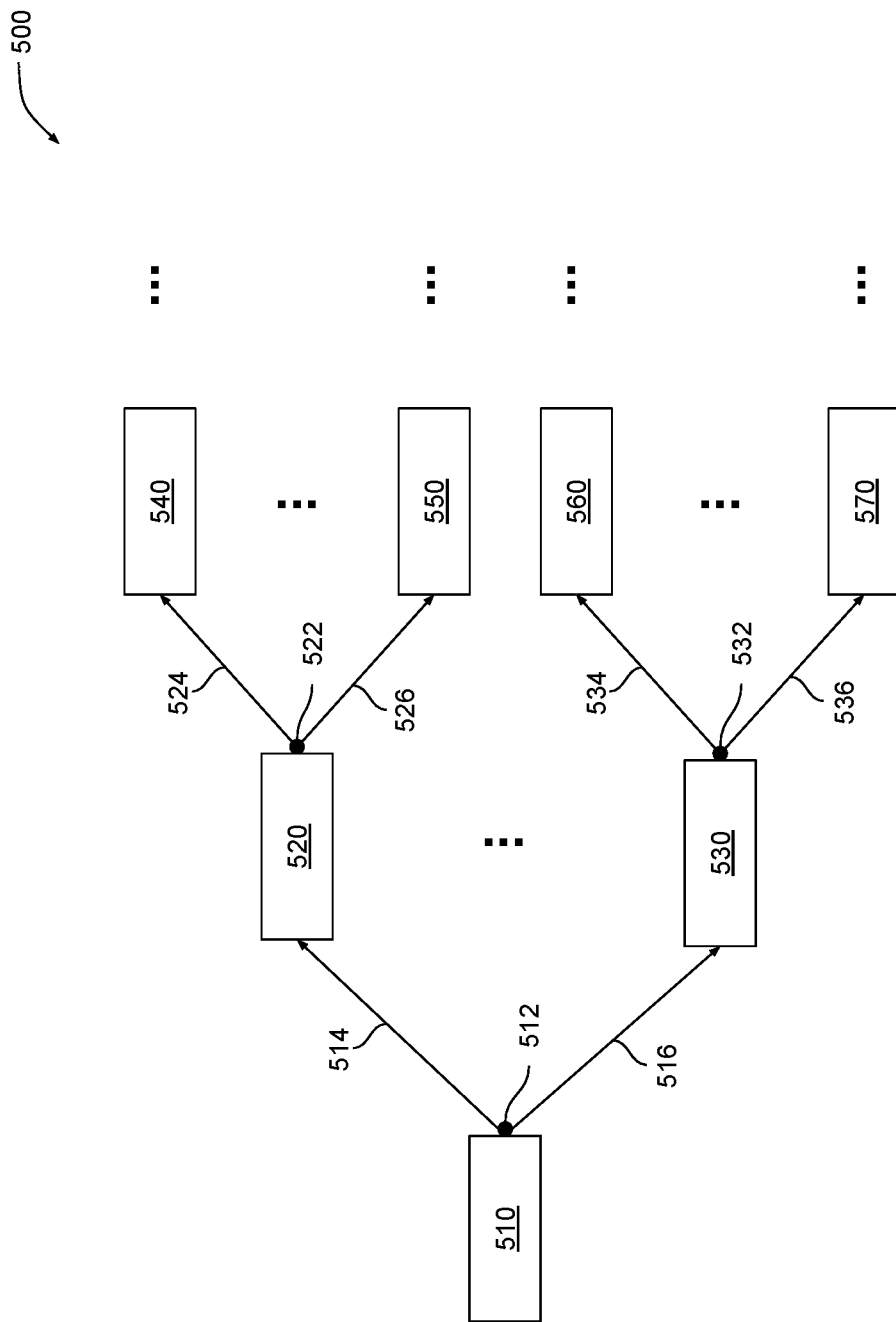
FIG. 5 illustrates an exemplary topology of the interactive media title of FIG. 4, according to various embodiments.

FIG. 5 illustrates an exemplary topology of the interactive media title of FIG. 4, according to various embodiments. As shown, topology 500 includes various segments coupled together in a branching manner to form a directed graph. Topology 500 generally defines the structure of interactive media title 460. During playback of interactive media title 460, the user encounters various choice points and may then decide how the feature should progress from a set of available options. Each option is associated with a corresponding segment of media content. A given segment generally describes how the choice of the associated option impacts the story being told, characters in that story, and other story elements. Accordingly, by making different decisions, the user can experience multiple versions of a given story or multiple related stories.

Topology 500 includes an introductory segment 510, intermediate segments 520 and 530, and alternate ending segments 540, 550, 560, and 570. Introductory segment 510 is played, at least in part, when playback of interactive media title 460 is initiated. Introductory segment 510 may introduce the user to the parameters of interactive media title 460, including how the user is expected to make decisions at certain times. Introductory segment 510 is associated with a choice point 512 and corresponding decision options 514 and 516.

When playback of introductory segment 510 reaches choice point 512, the user is provided with a description of the decision to be made, along with a description of decision options 514 and 516. The user may then select either of decision options 514 and 516 in order to cause interactive media title 460 to progress to either segment 520 or segment 530, respectively. Each such segment includes media content which expresses the outcome of selecting the corresponding option.

If the user selects option 514 at choice point 512, then playback proceeds through segment 520 and various media content describing the outcome of selecting option 514 is presented to the user. Playback of segment 520 then reaches choice point 522, which allows the user to select between decision options 524 and 526, corresponding to alternate endings 540 and 550, respectively. Each of these alternate endings may describe different ways in which the story being told becomes resolved (or in some cases, remains unresolved).

Alternatively, if the user selects option 516 at choice point 512, then playback proceeds through segment 530 and various other media content describing the outcome of selecting option 516 is presented. Playback of segment 530 then reaches choice point 532, and the user is provided with a choice between decision options 534 and 536, each corresponding to a different one of alternate endings 560 and 570. Similar to alternate endings 540 and 550, these alternate endings tell different versions of how the story ends.

In the exemplary topology 500, interactive media title 460 has four unique story arcs and four distinct endings. The user may traverse topology 500 via any of the story arcs by making different decisions at choice points 512, 522, and 532. Each different arc includes a different assortment of segments and, thus, varying media content. In one embodiment, any given choice point may represent an entry point into interactive media title 400, thereby allowing the user to initiate playback of interactive media title starting with many different segments. A given segment may be tagged with any form of metadata describing aspects of that content, including tags representing thematic elements of the segment, characters involved with the segment, objects present in the segment, and so forth. Arcs may be likewise tagged based on the associated segments. Persons skilled in the art will recognize that topology 500 is a directed graph, where choice points represent nodes and segments represent edges.

Although not shown in this example, different story arcs may converge onto a common segment, meaning that the common segment can be reached via multiple different sequences of choices. In addition, some alternate endings may include a return path to the introductory segment or a shortened version of the introductory segment. Alternatively, any other segment may be displayed to the user instead of the introductory segment or a shortened version thereof. In general, any segment may have a forward path or a return path to any portion of any other segment, allowing topologies to include any number of different cycles. With this flexibility, a topology can be generated which permits users to freely explore the interactive media title along any forward or return path.

When users explore an interactive media title, playback application 436 generates a set of state variables that are based on, at least in part, previous decisions made by the user and/or other users. These state variables can be used to modify a given choice point and associated options to provide users with a contextually relevant experience. For example, suppose the interactive media title is an adventure story where the user can select, at a particular choice point, whether a character in the story should craft a sword or a bow. A subsequent choice point could then include contextually relevant options, such as "swing sword" or "shoot arrow," depending on the weapon crafted at the previous choice point. Some segments may only be "unlocked" when the state variables have a particular configuration or the user makes a specific sequence of decisions. Such segments could be, for example, "Easter eggs" that include special content.

Via any of the above techniques, topologies having an arbitrary depth, branching, nesting, and/or cycles can be generated, corresponding to any technically feasible type of graph. How the user selects a particular decision option is explained in conjunction with FIG. 6.

Figure 6:
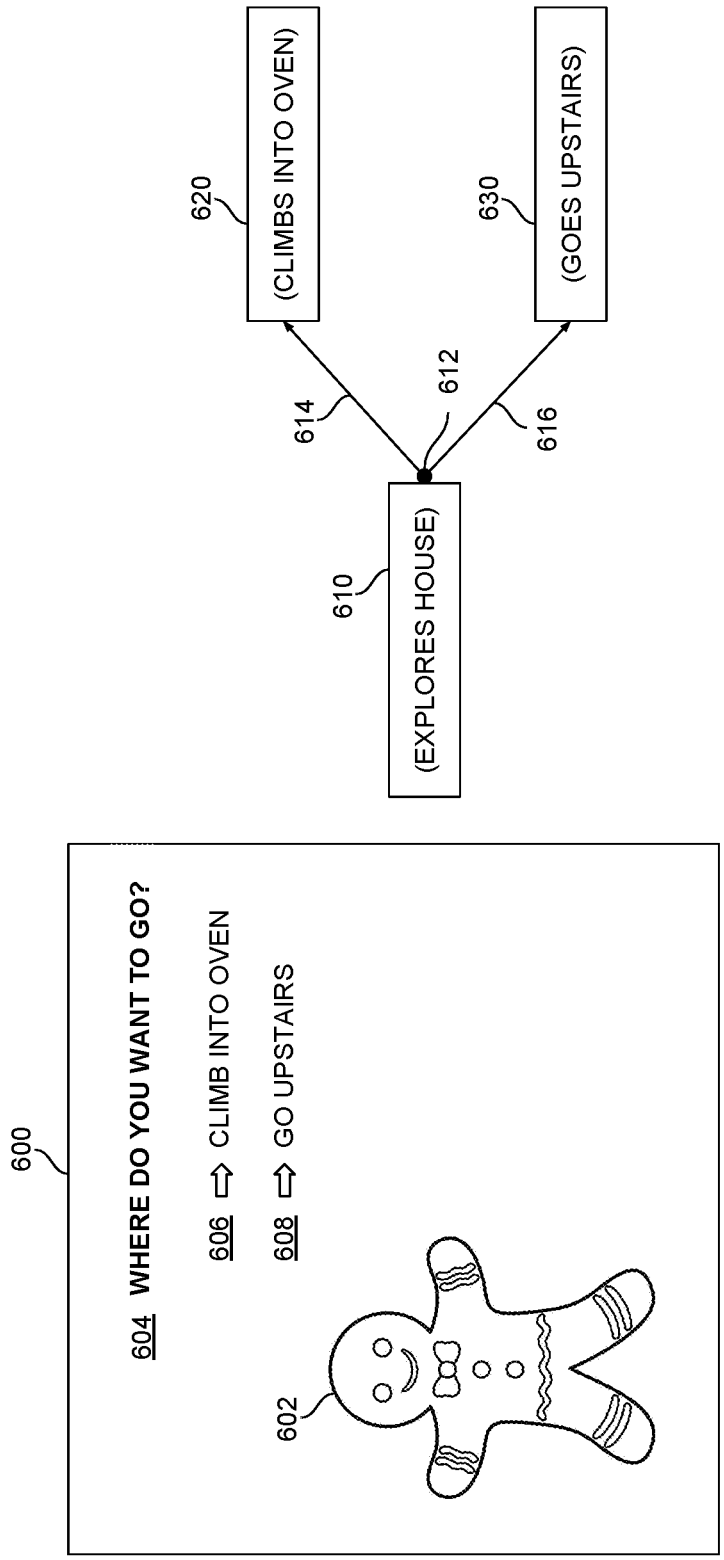
FIG. 6 illustrates an exemplary interface for selecting how an interactive media title unfolds, according to various embodiments.

FIG. 6 illustrates an exemplary interface for selecting how an interactive media title unfolds. As shown, an interface 600 provides a user of interactive media title 460 with the ability to decide what actions are performed by a character 602 in interactive media title 460. Playback application 436 causes interface 600 to appear when choice point 612 is activated. Choice point 612 may be activated during playback of segment 610 (where character 602 explores a house) or after playback of segment 610 is complete and playback reaches choice point 612. As a general matter, choice points can be "activated" during or after playback of corresponding segments. Accordingly, a given portion of a segment where a choice point can be activated may be considered a "choice region." When a given choice point is activated, playback application 436 displays interface 600 and the user can select an associated option. If the user selects an option before playback of the current segment is complete, playback application 436 may continue playing the remainder of the current segment or jump onwards to a subsequent segment associated with the selected option.

Interface 600 includes a description 604 of the decision to be made, along with the available decision options 606 and 608 associated with that decision. Here, the user is asked to select where character 602 should go while exploring the house. If the user selects option 606, then playback of interactive media title 460 proceeds along pathway 614 and segment 620 is played for the user. In this case, character 602 climbs into the oven. Otherwise, if the user selects option 608, then playback of interactive media title 460 proceeds along path 616 and segment 630 is played for the user, in which case character 602 goes upstairs.

Figure 7A:
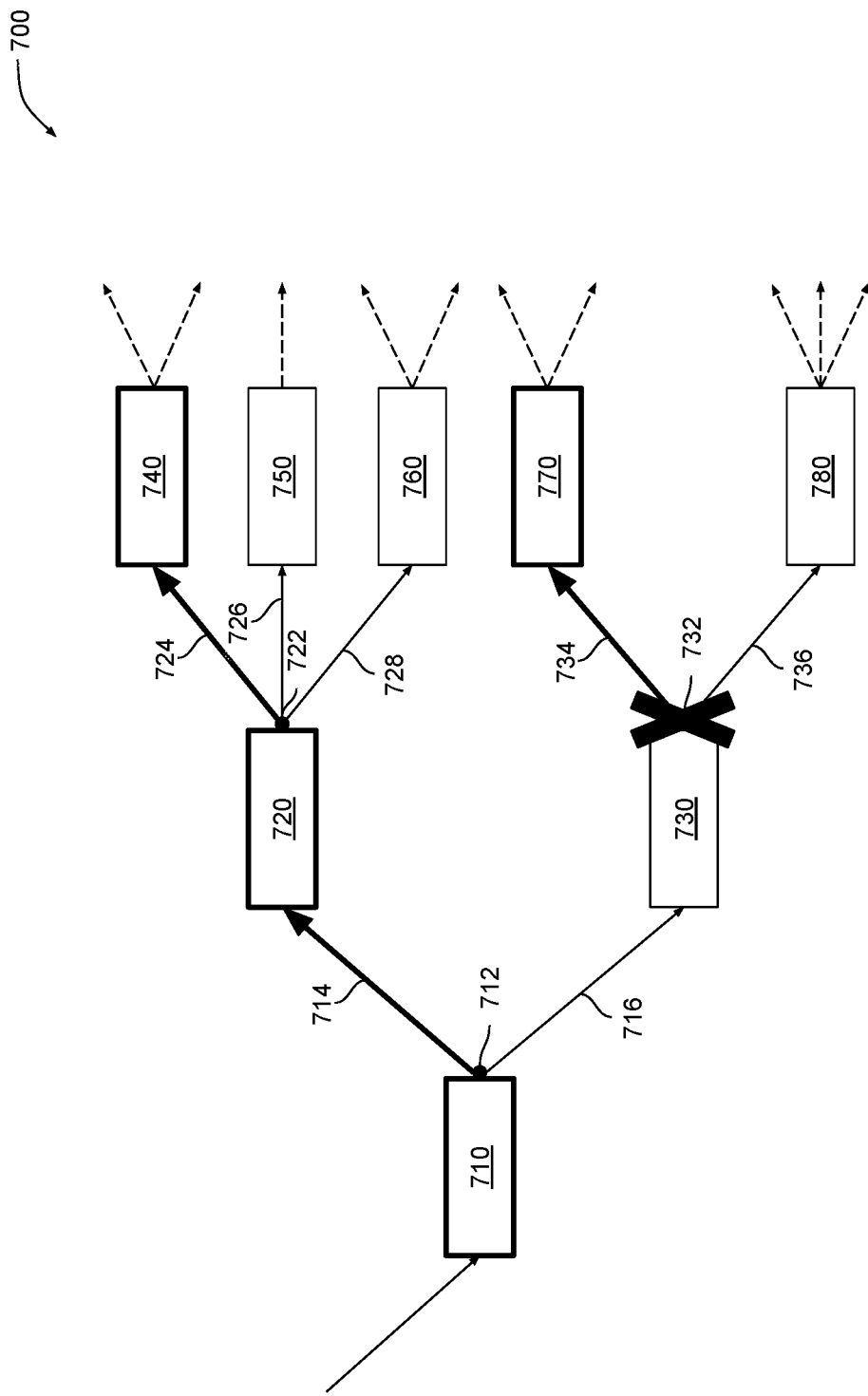
FIGS. 7A-7B illustrate how the topology of an interactive media title changes in response to suppressing a choice point, according to various embodiments.
Figure 7B:
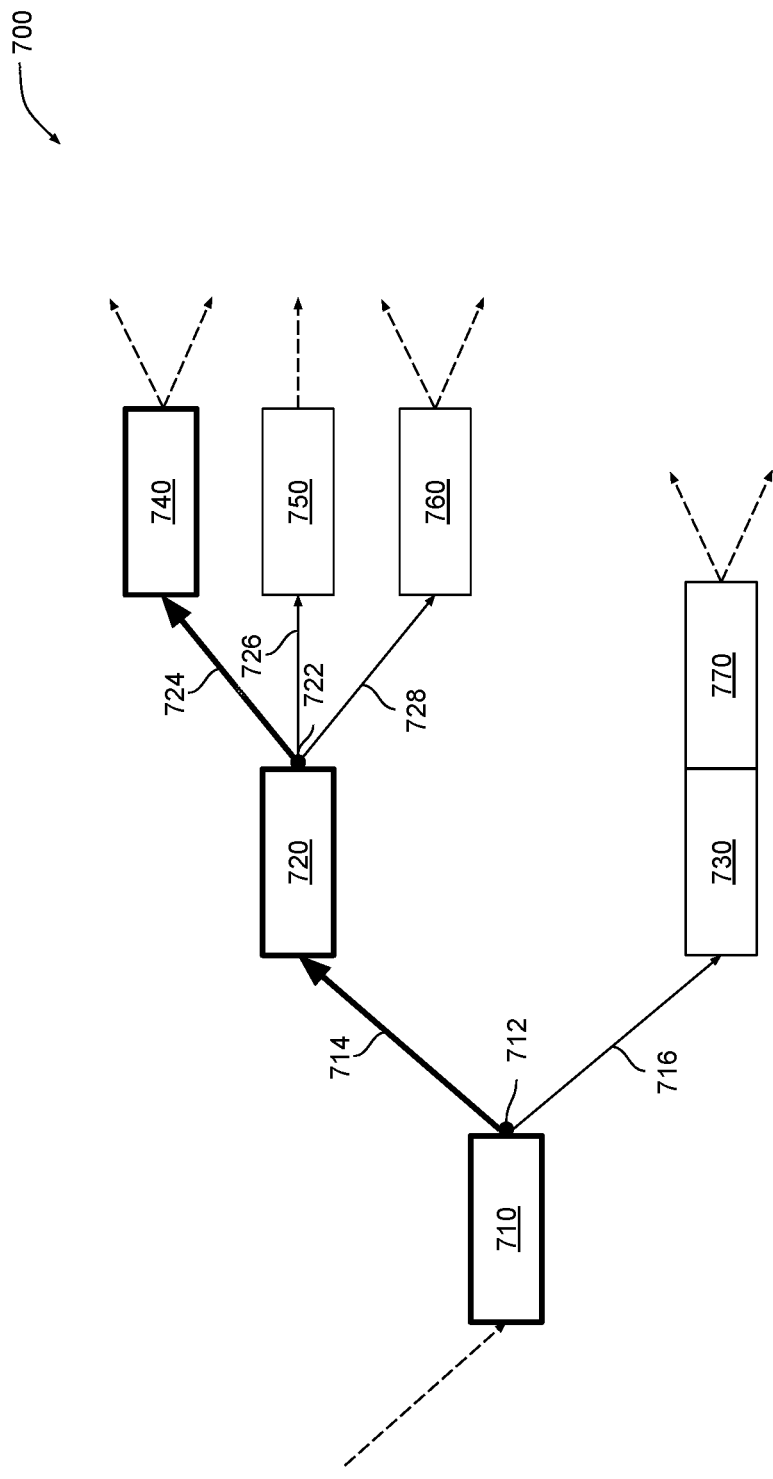
Figure 8A:
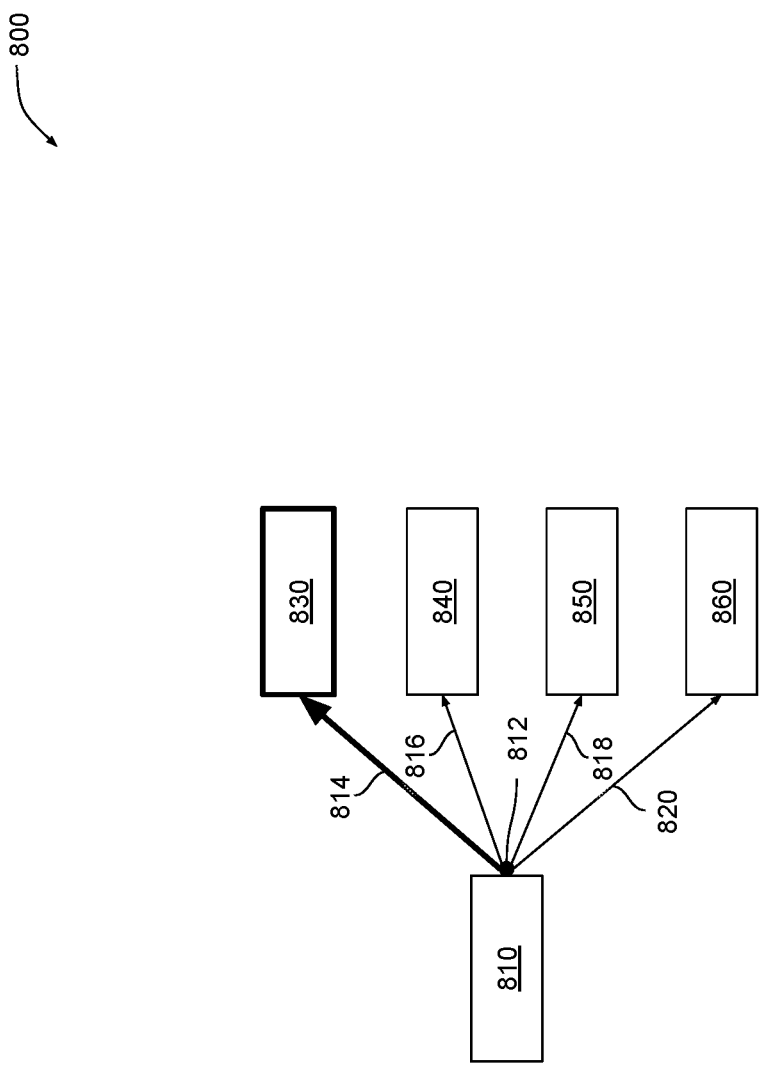
FIGS. 8A-8B illustrate how the topology of an interactive media title changes in response to modifying a set of options at a choice point, according to various embodiments.
Figure 8B:
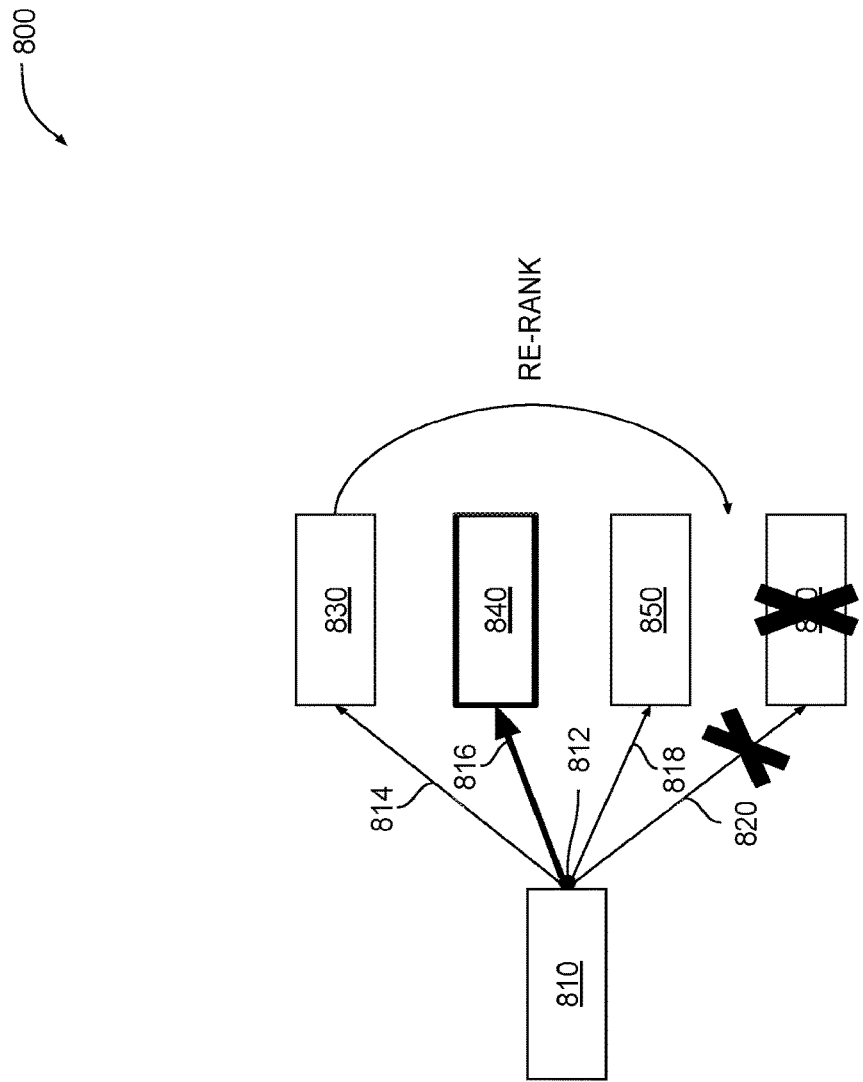

Playback application 436 is configured to traverse topologies of interactive media titles in the manner discussed above in conjunction with FIGS. 5-6. In addition, via topology generator 440 shown in FIG. 4, playback application 436 is also configured to generate and modify those topologies based on a wealth of contextual data indicating preferences of one or more users, historical decisions of users, predicted decisions of those users, network conditions, and other data that is described in greater detail below in conjunction with FIG. 10. FIGS. 7A-7B illustrate how playback application 436 modifies topologies by suppressing and unsuppressing choice points. FIGS. 8A-8B illustrate how playback application 436 modifies topologies by altering the available options associated with a given choice point.

Dynamic Topology Modification of an Interactive Media Title

FIGS. 7A-7B illustrate how the topology of an interactive media title changes in response to suppressing a choice point, according to various embodiments. As shown in FIG. 7A, an exemplary topology 700 includes segments 710, 720, 730, 740, 750, 760, 770, and 780, coupled together in the branching manner shown. Each of these segments is associated with a choice point and a set of corresponding options. Some options are emphasized in bold indicating that these options are designated to be the default selection.

In particular, options 714, 724, and 734 are designated as the default selections for choice points 712, 722, and 732, respectively. During playback of interactive media title 460, when the user reaches a given choice point, the default option for that choice point may be pre-selected, thereby allowing the user to simply accept that option and proceed to the associated segment. In one embodiment, at a given choice point a countdown timer is displayed indicating a time limit for selecting an option. When the timer elapses, playback proceeds along the default path.

The default option for a given choice point may be designated as such based on contextual data associated with the user. For example, playback application 436 could determine based on profile information that the user is primarily interested with romantic themes. Then, playback application 436 could identify that a particular option for a given decision involves a romantic theme, and then designate that option as the default for that user. Alternatively, the default option for a given decision may be determined based on statistics associated with other users who have engaged with interactive media title 460. For example, the default option could be designated as the most commonly selected option across a subset of users. The default option may also be designated based on network conditions. For example, the default option may be designated as the option associated with the segment that can be most efficiently buffered.

During playback, specific choice points can be suppressed or unsuppressed under varying circumstances and based on various data, thereby dynamically modifying topology 700. In the example shown, playback application 436 suppresses choice point 432. Then, as shown in FIG. 7B, playback application 436 modifies topology 700 by joining segment 730, via default option 734, with segment 770. When playback application 436 suppresses a choice point in this manner, the user is no longer presented with a choice of the associated options, and playback proceeds across the two joined segments seamlessly.

When suppressing choice points in this manner, playback application 436 can redirect the user along a specific path upon predicting that the specific path may be highly engaging to the user. In such situations, the user may not need to be bothered with making a choice because the likelihood that the user selects the specific path is exceedingly high. In one embodiment, playback application 436 evaluates a set of rules in order to determine whether a choice point should be available to the user and along which path the user should be redirected if the choice point is made unavailable to the user. Playback application 436 may evaluate these rules dynamically (i.e. via runtime execution of a rules engine) and based on any of the data discussed herein.

By suppressing choice points in the manner described, playback application 436 is capable of collapsing certain portions of topology 700. Then, by selectively unsuppressing choice points, playback application 436 may expand specific portions of topology 700, thereby providing the user with the opportunity to make new decisions not previously available. In one embodiment, some or all choice points in topology 700 are suppressed by default, and playback application 436 can then unsuppresses specific choice points based on data associated with the user. In this manner, playback application 436 tailors the structure of topology 700 to the user. In another embodiment, playback application 436 may suppress choice points to cause the interactive media title to temporarily assume the form of a conventional media title that does not allow any decisions to be made. This approach can be applied to produce a trailer or montage of the interactive media title. Playback application 436 may also adjust the set of available options for any given choice point, as described in greater detail below in conjunction with FIGS. 8A-8B.

FIGS. 8A-8B illustrate how the topology of an interactive media title changes in response to modifying a set of options at a choice point, according to various embodiments. As shown in FIG. 8A, a topology 800 includes a segment 800 and corresponding choice point 812. Decision point 812 is associated with options 814, 816, 818, and 820. These options respectively lead to segments 830, 840, 850, and 860. Option 814 is the default option and corresponding segment 830 the default segment. Accordingly, if the user does not make a decision at choice point 812, then playback proceeds automatically from segment 810 to segment 830. During playback, playback application 436 is configured to dynamically adjust the set of available options associated with choice point 812.

In particular, as shown in FIG. 8B, playback application 436 may change the default option, re-rank the available options, and suppress specific options. Here, playback application 436 designates option 816 as the default option along with corresponding segment 840. Playback application 436 also re-ranks option 814 and corresponding segment 830 to a lower position. Playback application 436 also suppresses option 820 and corresponding segment 860. According to these changes, when playback reaches choice point 812, playback application 436 displays option 816 as the default option, displays option 814 at the third position in a list of available options, and does not display option 820 at all. Playback application 436 may suppress options, in some cases, when those options are determined to be undesirable to many users.

Playback application 436 may also selectively unsuppress previously suppressed options in order to provide the user with access to options not previously available, thereby providing fresh content. In one embodiment, some or all options are suppressed by default, and playback application 436 selectively unsuppresses subsets of options when playback is initiated based on contextual data associated with the user. Then, over the course repeated playbacks, playback application 436 incrementally unsuppresses additional options, thereby continuously providing the user with the opportunity to explore new and unseen content associated with these newly unsuppressed options.

Referring generally to FIGS. 7A-8B, playback application 436 implements topology generator 440 to perform any of the topological adjustments discussed thus far dynamically and in real-time during playback of interactive media title 460. With these techniques, playback application 436 may provide the user with fresh and engaging content that is personalized for the user. In addition, playback application 436 may also initially provide a version of interactive media title 460 that is based on a topology dynamically generated to suit the user.

In addition to dynamically modifying the topology of interactive media title 460, playback application 436 also dynamically allocates network and device resources, via buffering engine 450, in order to efficiently, and in some cases predictively, buffer segments within interactive media title 460. By buffering segments in this manner, playback application 436 can provide a viewing experience to users that minimizes buffering delays. Various techniques implemented by buffering engine 450 are described in greater detail below in conjunction with FIGS. 9A-9C.

Dynamic Buffering of an Interactive Media Title

Figure 9A:
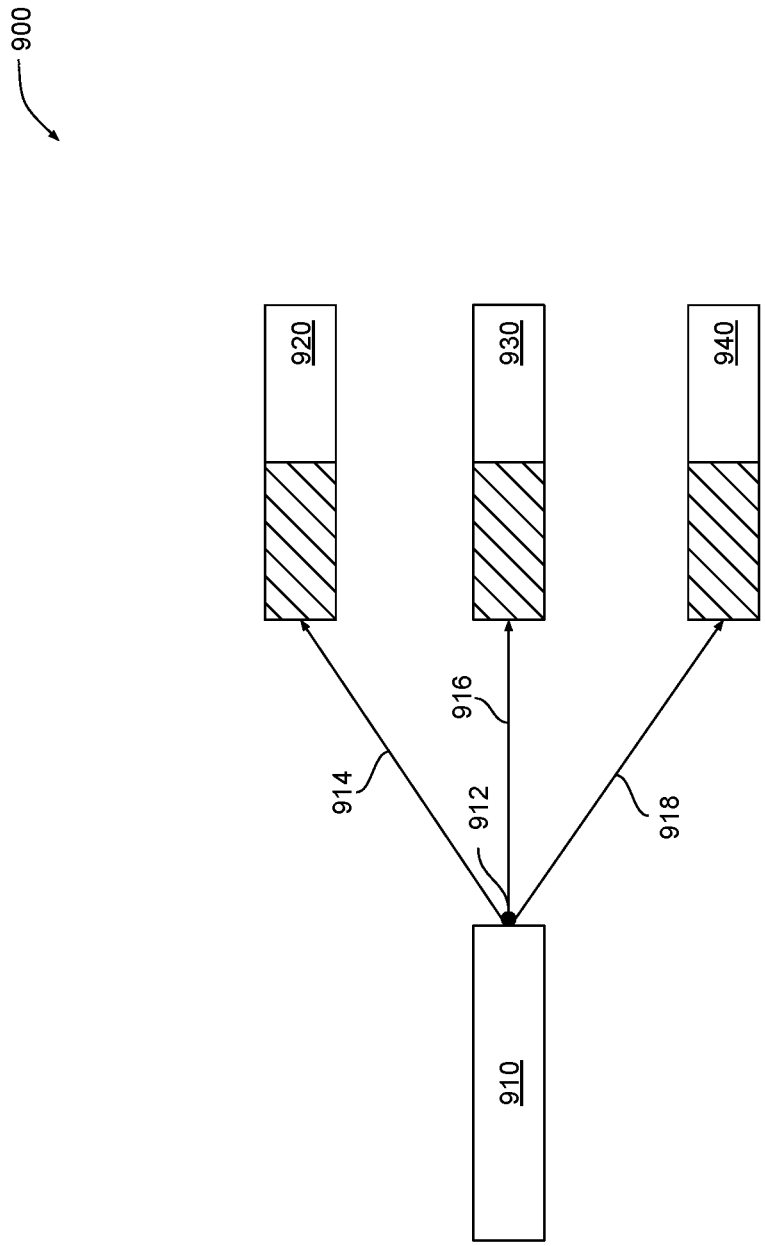
FIGS. 9A-9C illustrate how segments of an interactive media title can be buffered to optimize resource consumption and/or quality of experience, according to various embodiments.
Figure 9B:
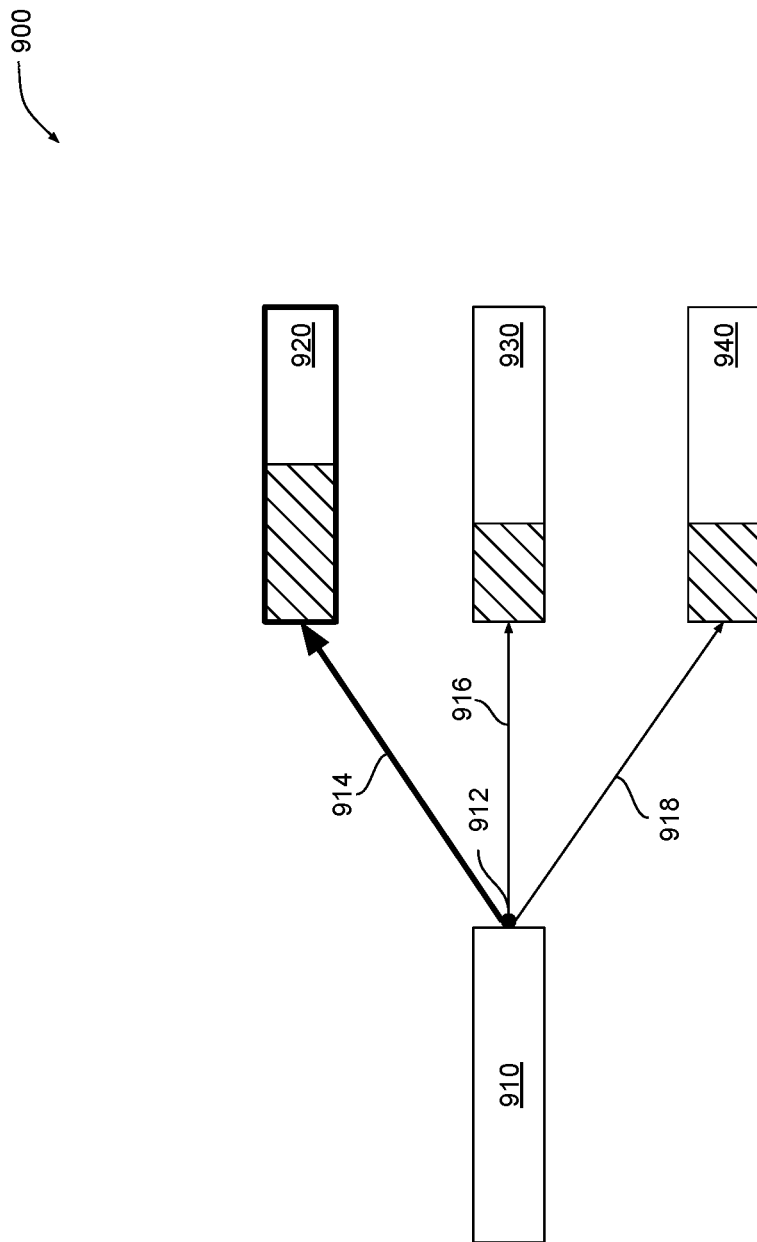
Figure 9C:
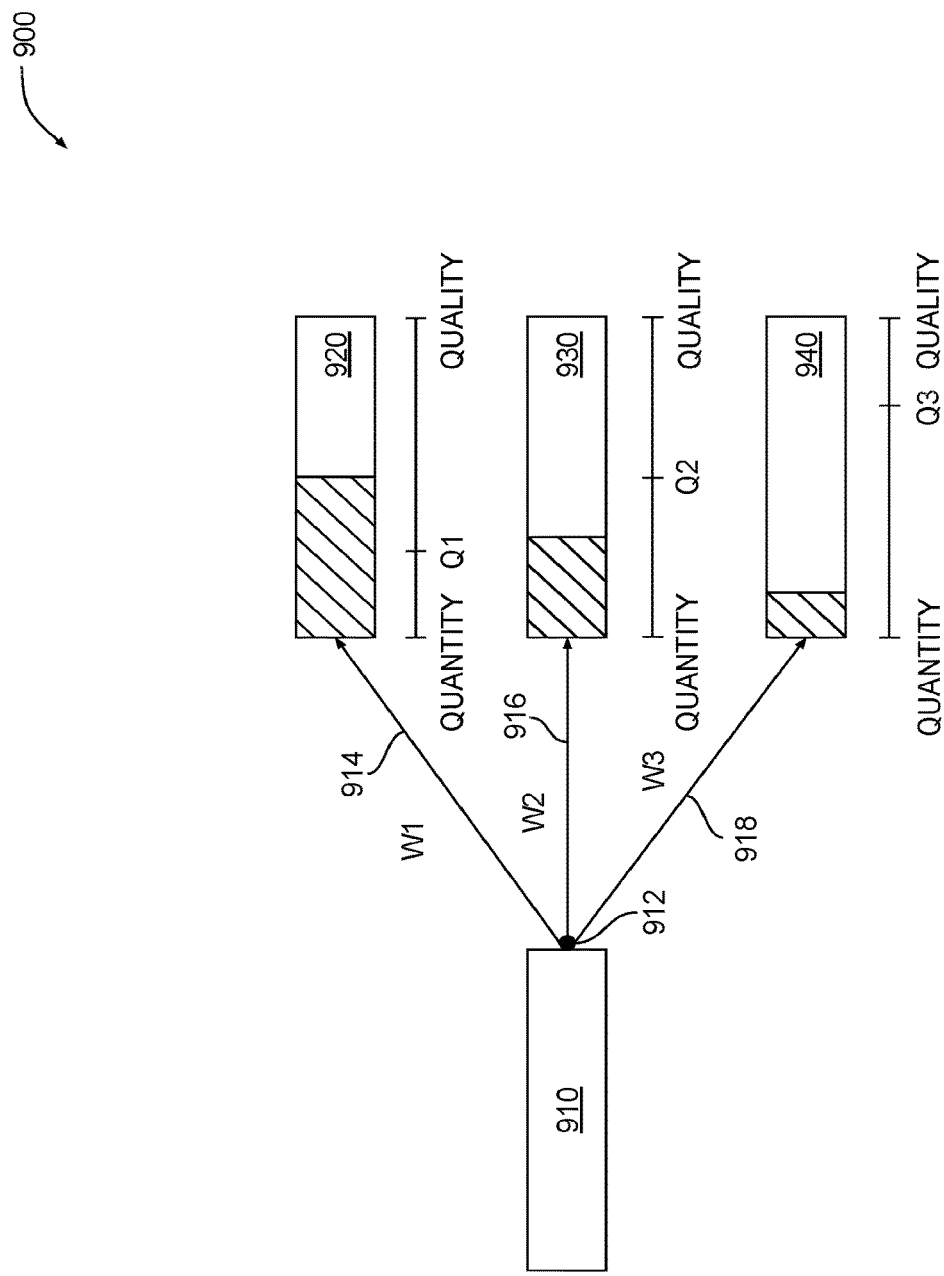

FIGS. 9A-9C illustrate how segments of an interactive media title can be buffered to optimize resource consumption and/or quality of experience, according to various embodiments. As shown in each of these Figures, a portion 900 of a topology includes a segment 910 that is associated with a choice point 912. Decision point 912 leads, via options 914, 916, and 918, to segments 920, 930, at 940, respectively. Each segment may be available in a range of qualities. For example, both a low-quality version and a high-quality version of segment 920 could be available for buffering. Segments 920, 930, and 940 can be buffered using various techniques for allocating a resource. The resource may include network resources, such as available bandwidth, bit rate, content server connections, and so forth, and/or device resources such as processor cycles and memory, among others.

As shown in FIG. 9A, with a simple allocation, the resource can be evenly allocated for buffering segments 920, 930, and 940. Here, buffering engine 450 buffers each segment at the same quality, and so equal amounts of each segment are buffered. Buffering engine 450 may implement the resource allocation shown here by default for each choice point in interactive media title 460. Buffering engine 450 can also selectively avoid buffering a specific segment that is unlikely to be played. In doing so, buffering engine 450 may allocate none of the resource to the specific segment unless the user selects that segment. Buffering engine 450 may adjust the resource allocation, on an ongoing basis, according to either or both of the other techniques described below in conjunction with FIGS. 9B-9C.

As shown in FIG. 9B, with a slightly more complex allocation, the resource can be distributed based on which option is designated as the default. Here, option 914 is the default option and so buffering engine 450 allocates more resource for buffering segment 920 compared to the amount of resource allocated for buffering segments 930 and 940. Accordingly, a larger portion of segment 920 is buffered compared to segments 930 and 940. This approach may be useful in situations where the default option is designated based on a statistical analysis of decisions made across a collection of users. In particular, when the most popular option is designated as the default, then allocating more network resource for buffering the associated segment may provide more users with a seamless viewing experience having minimal buffering delays.

In the above example, buffering engine 450 buffers each segment at the same quality, although buffering engine 450 can also buffer those segments at different qualities. For example, buffering engine 450 could allocate more resource to buffering a higher quality version of segment 920 and allocate less resource to buffering lower quality versions of segments 930 and 940. In this situation, buffering engine 450 could buffer equal amounts of all three segments. FIG. 9C illustrates one specific approach to buffering segments based quality.

As shown in FIG. 9C, with an even more complex allocation, the network resource can be distributed according to a set of buffering parameters associated with the available options and corresponding segments. Each option 914, 916, and 918 is associated with a different weight parameter W1, W2, and W3. The weight value associated with a given option may represent the probability that the option is selected based on profile data associated with the user and/or statistical data associated with one or more other users. In some situations the weight value associated with a given segment may be set to zero, which prevents any portion of the segment from being buffered unless the user selects the option corresponding to that segment.

Each segment 920, 930, and 940 is associated with a different quality parameter Q1, Q2, and Q3. The quality parameter associated with a given segment may indicate how resource allocation should be scaled between quality versus quantity. Depending on the particular configuration of the quality parameters Q1, Q2, and Q3, buffering engine 450 selects the appropriate quality at which to buffer the segment. For example, Q1 indicates that resources should be preferentially allocated to buffering more frames of a lower quality version of segment 920 (meaning that more lower quality frames of that segment may be available, thereby lowering re-buffer risk). Conversely, Q3 indicates that resources should be preferentially allocated to buffering fewer frames of a higher quality version of segment 940 (meaning that fewer higher quality frames of that segment may be available, potentially increasing re-buffer risk). The term "re-buffer risk" generally refers to the likelihood that buffer underrun occurs during playback of a particular segment and could be determined, for example, based on the amount of the particular segment that is buffered.

With any of the techniques described above, buffering engine 450 may buffer all segments at the same quality or, alternatively, determine a particular quality at which to buffer any given segment. In the former case, buffering engine 450 could, for example, determine a default quality for buffering all segments based on how much of the resource is available. In the latter case, buffering engine 450 could, for example, determine the particular quality at which to buffer a given segment based on the weight value W assigned to that segment. In this case, buffering engine 450 could buffer equal amounts of each segment, although the buffered amounts might have different qualities.

In one embodiment, the weight values and quality parameters associated with each option and corresponding segment are set based on the media content associated with the segment. For example, a segment that requires a higher bit rate in order to display video without artifacts could be assigned a higher quality parameter and/or a higher weight value. Conversely, a segment that does not require a high bit rate could be assigned a lower quality parameter and lower weight value. In another example, a segment associated with an ending of interactive media title 460 could be assigned a higher weight value, compared to an intermediate segment which could be assigned a lower weight value.

In another embodiment, the weight values and quality parameters associated with each option and corresponding segment are set by default. Then, buffering engine 450 iteratively adjusts those values over many viewings of interactive media title 460 in order to optimize a given objective function. The objective function could be, for example, a model of quality of experience (QOE) that captures one or more tradeoffs between quality and re-buffer risk. Buffering engine 450 may implement any technically feasible form of optimization process in order to optimize the given objective function.

Buffering engine 450 implements any one or more of the above techniques in order to deliver content to the user with minimal delays. Playback application 436 can stream the relevant segment immediately after the corresponding option is selected, thereby providing the user with a sense of instant gratification. Playback application 436 may, in some cases, implement the above techniques to predictively buffer or "pre-fetch" segments before a corresponding choice point is activated. For example, playback application 436 could pre-fetch at least a portion of a particular alternate ending when the user first begins interacting with the interactive mediate title. As a general matter, the resource allocation techniques described above can be applied to buffer any set of segments associated with any choice point at any time during playback of the interactive media title.

Practically, playback application 436 implements any of the foregoing techniques, and potentially others, to minimize delays. In one embodiment, playback application 436 plays a common piece of interstitial content immediately after a decision is made, regardless of the selected option. That interstitial piece of content can be buffered early, when a previous option is selected, and may then be played without delay. During playback of that content, a segment associated with the selected option is buffered to minimize delays when the segment is subsequently played.

Figure 10:
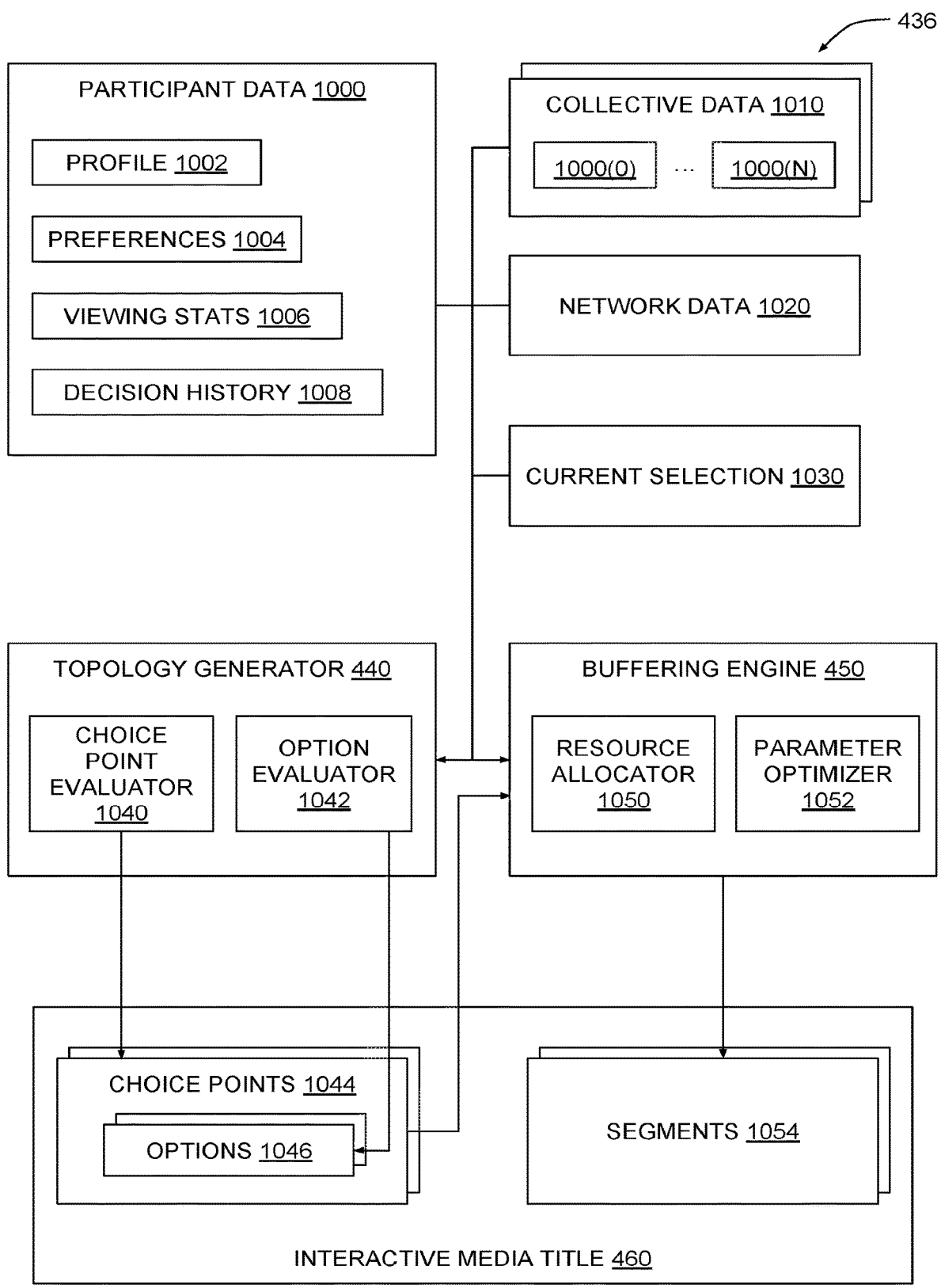
FIG. 10 is a more detailed illustration of the playback application of FIG. 4, according to various embodiments.

Playback application 436 may perform any of the techniques described thus far based on any technically feasible form of data and via any one or more specialized submodules. For example, as discussed, topology generator 440 and buffering engine 450 may implement the topological modifications and optimized buffering techniques discussed above based on contextual data associated with the user, among other data. Playback application 436 and/or any of the associated submodules included therein may execute on any of the devices discussed herein. For example, topology generator 440 could execute on the control server 110 of FIGS. 1 and 3 in addition to, or instead of, executing on the endpoint device of FIG. 4. FIG. 10 illustrates in greater detail how playback application 436 implements the various operations discussed thus far.

Playback Application Implementation

FIG. 10 is a more detailed illustration of the playback application of FIG. 4, according to various embodiments. As shown, playback application 436 includes topology generator 440, buffering engine 450, and interactive media title 460, as also shown in FIG. 4.

Topology generator 440 and buffering engine 450 operate based on various types of data, including user data 1000, collective data 1010, network data 1020, and current selection 1030. User data 1000 includes profile 1002, preferences 1004, viewing statistics (stats) 1006, and decision history 1008. Profile 1002 is a personalized representation of the user generated based on previous content viewed by the user. Profile 1002 may indicate themes in which the user has expressed interest, tags associated with content that the user has viewed, demographic information associated with the user, and so forth. Preferences 1004 may indicate settings which the user has configured to indicate the types of content the user prefers to consume. Viewing stats 1006 may include indications of the particular titles that the user has selected and proportions of those titles which the user has completed. Decision history 1008 may include a complete history of all decisions that the user has made when interacting with any interactive media title.

Collective data 1010 may include various participant data 1000(0) through 1000(N) collected across numerous other users, including those who have engaged with interactive media title 460 and/or other interactive media titles and/or specific paths users have taken through those interactive media titles. Network data 1020 includes various metrics associated with network 105, including available bandwidth, bandwidth fluctuations over time, connection reliability, packet loss rate, and so forth. Current selection 1030 indicates the current options associated with interactive media title 460 which the user has most recently selected. Current selection 1030 may subsequently be incorporated into decision history 1008.

In operation, topology generator 440 processes some or all of the data discussed thus far (and potentially other data) and then implements a choice point evaluator 1040 and an option evaluator 1042 in order to perform the dynamic topological modifications discussed above in conjunction with 7A-8B. Choice point evaluator 1040 implements a rules engine configured to determine whether any given choice point should be suppressed or unsuppressed based on any of the above data. Choice point evaluator 1040 generates and/or modifies choice points 1044 within interactive media title 460 via execution of the rules engine. Choice point evaluator 1040 may execute the rules engine offline or dynamically during runtime of playback application 436. Option evaluator 1042 implements another rules engine configured to determine a default option and a ranking of options for each choice point 1044. Option evaluator 1042 may also suppress and unsuppress particular options 1046 via execution of this other rules engine. Option evaluator 1042 may execute the rules engine offline or dynamically during runtime of playback application 436.

Buffering engine 450 also processes some or all of the data discussed thus far (and potentially other data) and then implements a resource allocator 1050 and a parameter optimizer 1052 in order to buffer segments 1054. A given segment 1054 may correspond to a particular option 1046. Resource allocator 1050 implements any of the allocation techniques discussed above in conjunction with FIGS. 9A-9C in order to allocate network and/or device resources to buffering some or all portions of segments 1054. Parameter optimizer 1052 is configured to incrementally adjust various buffering parameters implemented by resource allocator 1050 in order to maximize a quality metric.

In one embodiment, buffering engine 450 analyzes any and all of the data discussed thus far and then generates a machine learning model of the user which, given a particular user state, predicts the most likely subsequent segments to be played. The machine learning model may include a parameterized decision process, such as a weighted state transition diagram, a classification network, a decision tree, or any other technically feasible approach to modeling a user making a discrete decision based on historical data. Then, buffering engine 450 determines values for the various buffering parameters in accordance with the generated model. Because buffering engine 450 performs this process using data associated with the user as well as data associated with other users, buffering engine 450 generally performs a collaborative filtering operation. With this approach, buffering engine 450 attempts to predict specific decisions made by the user in order to predictively buffer the relevant content.

In performing any of the techniques described above, playback application 436 implements specific procedures that are described in greater detail below in conjunction with FIGS. 11-12.

Procedures for Modifying Topology and Buffering Content

Figure 11:
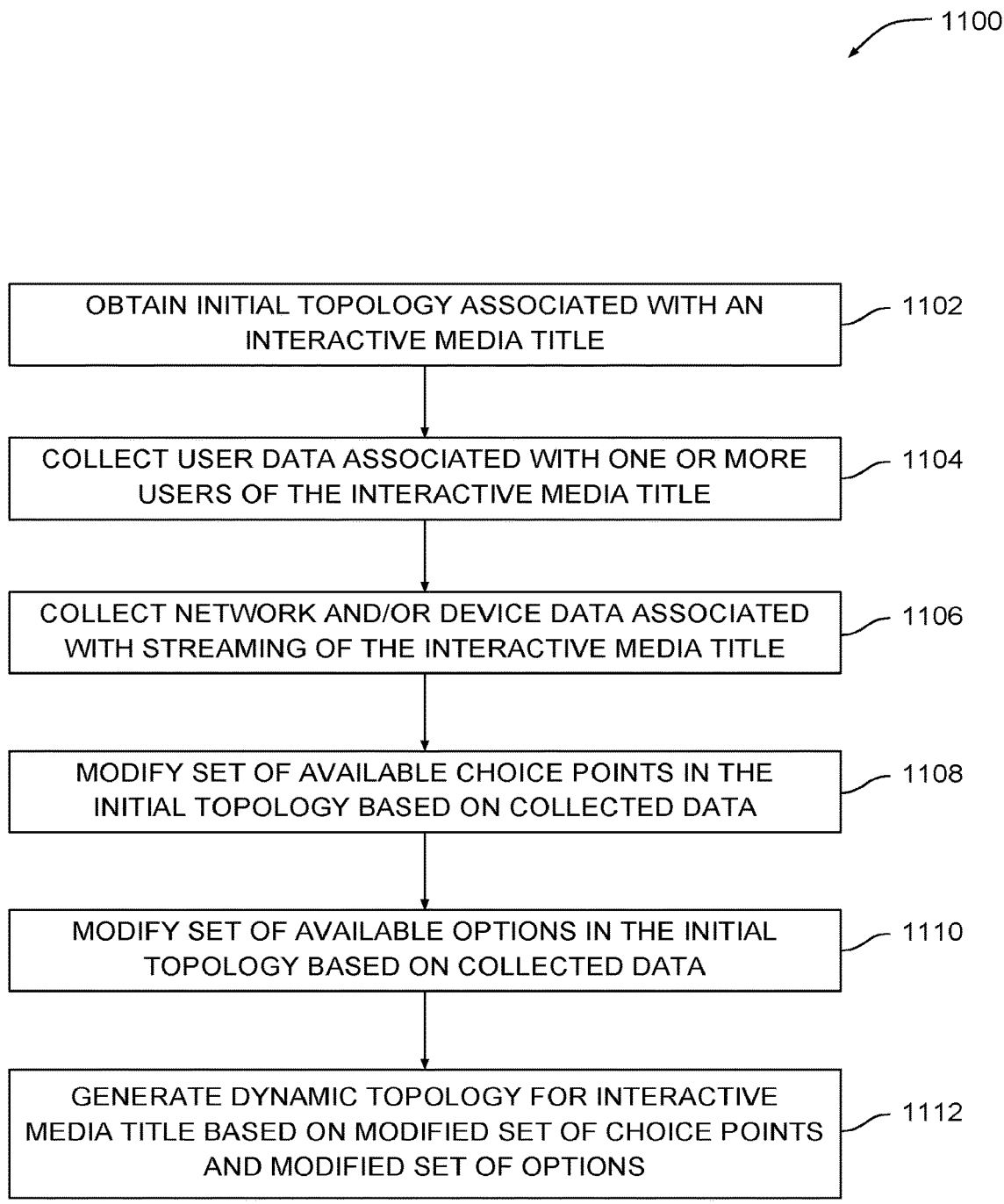
FIG. 11 is a flow diagram of method steps for dynamically modifying the topology of an interactive media title, according to various embodiments.

FIG. 11 is a flow diagram of method steps for dynamically modifying the topology of an interactive media title, according to various embodiments. Although the method steps are described in conjunction with the systems of FIGS. 1-10, persons skilled in the art will understand that any system configured to perform the method steps, in any order, is within the scope of the present invention.

As shown, a method 1100 begins at step 1102, where playback application 436 (via topology generator 440) obtains an initial topology for an interactive media title. The initial topology may include all choice points and associated options. Some or all of those choice points and options may be suppressed by default, or a specific subset of those choice points and options may be suppressed. In one embodiment, only the most popular choice points and most popular options are unsuppressed by default, and other less popular choice points and less popular options are suppressed and may be unsuppressed dynamically during playback.

At step 1104, playback application 436 collects user data associated with one or more users of the interactive media title. Those users may include the user currently engaged with the interactive media title, other users engaged with the interactive media title, as well as other users who have interacted with other interactive media titles. At step 1106, playback application 436 collects network data associated with a network across which the interactive media title streams. That network data may include average available bandwidth, bandwidth variance over time, signal to noise ratio, bandwidth consumption trends, and so forth.

At step 1108, playback application 436 modifies the set of available choice points in the initial topology based on collected data. In doing so, playback application 436 may suppress or unsuppress any choice point. In one embodiment, playback application 436 selects at least one choice point suppressed by default and then unsuppresses that choice point based on the collected data. The collected data could indicate, for example, that the user has already encountered a threshold fraction of available choice points and should therefore be presented with one or more previously unseen choice points. At step 1110, playback application 436 modifies a set of available decision options in the initial topology based on the collected data. In such situations, the collected data could indicate that a previously suppressed option may have an increasing popularity amongst other users for whom that option has already been unsuppressed.

At step 1112, playback application 436 generates a dynamic topology for the interactive media title based on the modified set of choice points and the modified set of decision outcomes. The dynamic topology includes a different configuration of suppressed versus unsuppressed choice points and/or a different configuration of suppressed versus unsuppressed options compared to the initial topology. Accordingly, the dynamic topology has a fundamentally different underlying structure compared to the initial topology of the interactive media title, and therefore may be more engaging to the user even after repeated engagements with the interactive media title.

Figure 12:
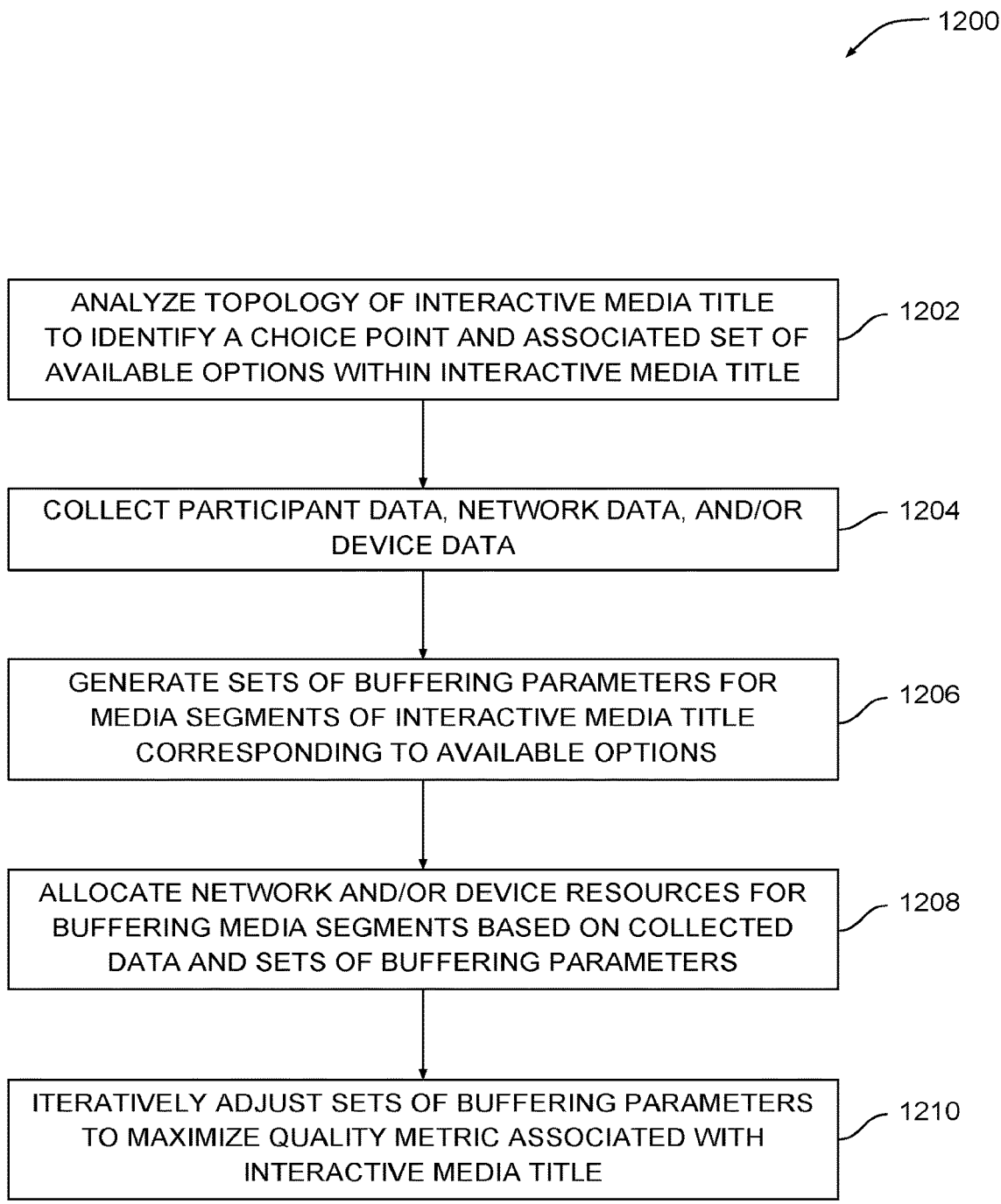
FIG. 12 is a flow diagram of method steps for buffering segments of an interactive media title, according to various embodiments.

FIG. 12 is a flow diagram of method steps for buffering segments of an interactive media title, according to various embodiments. Although the method steps are described in conjunction with the systems of FIGS. 1-10, persons skilled in the art will understand that any system configured to perform the method steps, in any order, is within the scope of the present invention.

As shown, a method 1200 begins at step 1202, where playback application 436 (via buffering engine 450) analyzes the topology of an interactive media title to identify a choice point and associated set of available options within the interactive media title. The topology includes a collection of choice points and, for each such choice point, a corresponding set of options. Some choice points and some options may be suppressed by default. Playback application 436 generally selects a choice point at step 1202 that is not currently suppressed, and similarly identifies corresponding options that are not currently suppressed.

At step 1204, playback application 436 collects user data and network data. The collected user data may reflect viewing statistics, thematic preferences, configuration settings, patterns of interaction, and any other technically feasible type of information that can be used to characterize any human behavior. The network data generally includes bandwidth availability data, packet error loss rates, streaming characteristics, and so forth. Playback application 436 may also gather other contextual data, including environmental data, weather information, and time of day, among others.

At step 1206, playback application 436 generates sets of buffering parameters for media segments of the interactive media title corresponding to available options. The buffering parameters generally indicate an amount of network and/or device resource that should be allocated for buffering each segment. In one embodiment, at least one of the buffering parameters for a given media segment is proportional to the likelihood that the option associated with the given media segment is selected by the user. The buffering parameters may also indicate how much of a given segment should be buffered versus the quality of segment buffered.

At step 1208, playback application 436 allocates resources for buffering (and/or processing) media segments based on collected data and the sets of buffering parameters generated at step 1206. In doing so, playback application 436 may cause a larger fraction of a first segment to be buffered compared to any other segment. The first segment could, for example, be associated with the most popular option for the associated choice point. Playback application 436 may perform step 1208 dynamically during playback or before playback begins. As a general matter, the allocation of resources for streaming, buffering, and/or processing segments associated with any given choice point may occur at any time before or during playback of any portion of the interactive media title. For example, playback application 436 could implement step 1208 to pre-fetch one or more segments before any choice points associated with those segments have been activated.

At step 1210, playback application 436 iteratively adjusts sets of buffering parameters to maximize a quality metric associated with the interactive media title. In one embodiment, playback application 436 performs an online or offline optimization process in order to optimize the evaluation of an objective function. The optimization process may involve iterative adjustment and re-evaluation of the sets of buffering parameters until some convergence criterion is met. The objective function may represent QOE and capture one or more tradeoffs between quality and re-buffer risk.

Referring generally to FIGS. 11-12, the procedures described in conjunction with these Figures confer several advantageous features to playback application 436. First, via the method 1100, playback application 436 is capable of generating and modifying interactive media titles dynamically, thereby promoting engagement amongst users. Secondly, via the method 1200, playback application 436 is capable of delivering content associated with interactive media titles with limited noticeable buffering, thereby improving user experience and engagement.

In sum, a playback application is configured to dynamically generate topology for an interactive media title. The playback application obtains an initial topology and also collects various data associated with a user interacting with the feature. The playback application then modifies the initial topology, based on the collected data, to generate a dynamic topology tailored to the user. The dynamic topology describes the set of choices available to the user during playback as well as which options can be selected by the user when making a given choice. In addition, the playback application also selectively buffers different portions of the interactive media title, based on the collected data, in anticipation of the user selecting particular options for available choices.

One advantage of the techniques described herein is that the interactive media title presents different choices to one or more users across different interactive sessions, thereby avoiding situations where users are required to repeatedly make the same choices. Another advantage of the disclosed techniques is that various resources are efficiently allocated to buffering portions of the interactive media title that are more likely to be selected. Those resources may include network resources such as bandwidth, as well as device resources including processor cycles and memory. Accordingly, the disclosed techniques provide multiple technological advancements over the prior art.

1. Some embodiments include a computer-implemented method, comprising identifying a first choice point included in a first topology of an interactive media title, wherein the first topology indicates a first plurality of segments of the interactive media title that can be played in response to one or more user selections made in conjunction with the first choice point, generating first user data associated with a first set of users who have accessed the interactive media title, generating a separate set of buffering parameters for each segment included in the first plurality of segments based on the first user data, at least partially buffering two or more segments included in the first plurality of segments based on the separate sets of buffering parameters associated with the two or more segments, and transmitting a buffered portion of a first segment included in the two or more segments to an output device in response to a first user selection made by the first user in conjunction with the first choice point.

2. The computer-implemented method of clause 1, wherein the two or more segments are at least partially buffered prior to when the interactive media title reaches the first choice point during playback.

3. The computer-implemented method of any of clauses 1-2, wherein the separate sets of buffering parameters include identical buffering parameters.

4. The computer-implemented method of any of clauses 1-3, wherein the first segment is associated with a first set of buffering parameters.

5. The computer-implemented method of any of clauses 1-4, further comprising generating the first set of buffering parameters based on a number of times the first selection is made by the first user or one or more other users.

6. The computer-implemented method of any of clauses 1-5, further comprising generating a behavior model of the first user based on the first user data, wherein the first set of users includes the first user, generating a first probability value based on the behavior model that indicates a likelihood that the first user selection will be received from the first user, and generating the first set of buffering parameters based on the first probability value.

7. The computer-implemented method of any of clauses 1-6, wherein the first set of buffering parameters indicates a first proportion of a network and/or device resource that should be allocated to buffering the first segment.

8. The computer-implemented method of any of clauses 1-7, wherein the network and/or device resource comprises at least one of bandwidth associated with a network being used to stream the interactive media title to the first user, processor cycles associated with a processor used to stream the interactive media title to the first user, and memory used to store at least a portion of the interactive media title.

9. The computer-implemented method of any of clauses 1-8, wherein the first set of buffering parameters indicates that a quality measure associated with the first segment should exceed a quantity measure associated with the first segment when buffering the first segment.

10. The computer-implemented method of any of clauses 1-9, wherein the first set of buffering parameters indicates that a quantity measure associated with the first segment should exceed a quality measure associated with the first segment when buffering of the first segment.

11. Some embodiments include a non-transitory computer-readable medium storing instructions that, when executed by a processor, perform the steps of identifying a first choice point included in a first topology of an interactive media title, wherein the first topology indicates a first plurality of segments of the interactive media title that can be played in response to one or more user selections made in conjunction with the first choice point, generating a separate set of buffering parameters for each segment included in the first plurality of segments based on user data associated with a plurality of users of the interactive media title, at least partially buffering two or more segments included in the first plurality of segments based on the separate sets of buffering parameters associated with the two or more segments, and transmitting a buffered portion of a first segment included in the two or more segments to an output device in response to a first user selection made by a first user in conjunction with the first choice point.

12. The non-transitory computer-readable medium of clause 11, wherein the two or more segments are at least partially buffered prior to when the interactive media title reaches the first choice point during playback.

13. The non-transitory computer-readable medium of any of clauses 11-12, wherein the separate sets of buffering parameters include identical buffering parameters.

14. The non-transitory computer-readable medium of any of clauses 11-13, wherein the first segment is associated with a first set of buffering parameters.

15. The non-transitory computer-readable medium of any of clauses 11-14, further comprising generating the first set of buffering parameters based on a number of times the first selection is made by the first user or one or more other users.

16. The non-transitory computer-readable medium of any of clauses 11-15, further comprising generating a behavior model of the first user based on first user data associated with the first user, generating a first probability value based on the behavior model that indicates a likelihood that the first user selection will be received from the first user, and generating the first set of buffering parameters based on the first probability value.

17. The non-transitory computer-readable medium of any of clauses 11-16, wherein the first set of buffering parameters indicates a first proportion of a network resource that should be allocated to buffering the first segment, wherein the network resource comprises bandwidth associated with a network being used to stream the interactive media title to the first user.

18. The non-transitory computer-readable medium of any of clauses 11-17, further comprising adjusting at least one buffering parameter included in the first set of buffering parameters in order to increase a first quality metric associated with the first segment.

19. The non-transitory computer-readable medium of any of clauses 11-18, wherein the first set of buffering parameters includes at least one of a bit rate for buffering the first segment, a resolution of the first segment, and a proportion of a network resource to consume when buffering the first segment.

20. Some embodiments include a system, comprising a memory storing a playback application, and a processor that, upon executing the playback application, is configured to perform the steps of identifying two or more segments associated with a first topology of an interactive media title, wherein the two or more segments can be played in response to user selections, generating a separate set of buffering parameters for each of the two or more segments, at least partially buffering the two or more segments based on the separate sets of buffering parameters, and transmitting a buffered portion of a first segment included in the two or more segments to an output device in response to a first user selection made by a first user.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method, comprising:
causing a first portion of a media content item to be output via at least one output device;
buffering at least part of a second portion of the media content item based on one or more parameters that indicate an amount versus a quality of the at least part of the second portion of the media content item to buffer, wherein the one or more parameters are determined based on behavioral data associated with one or more users;
causing a description of a playback option to be output via the at least one output device; and
in response to not receiving a user selection of the playback option, causing the at least part of the second portion of the media content item to be output via the at least one output device.

2. The computer-implemented method of claim 1, further comprising, in response to receiving a user selection of the playback option, causing the at least part of the second portion of the media content item to not be output via the at least one output device.

3. The computer-implemented method of claim 1, wherein the description of the playback option is output simultaneously with at least part of the first portion of the media content.

4. The computer-implemented method of claim 1, further comprising causing a countdown timer to be output via the at least one output device while the first portion of the media content item is output via the at least one output device.

5. The computer-implemented method of claim 1, wherein the at least part of the second portion of the media content item is caused to be output in response to a user selection of the playback option not being received within a predefined amount of time.

6. The computer-implemented method of claim 1, wherein the one or more parameters include at least one parameter associated with at least one of a device resource or a network resource.

7. The computer-implemented method of claim 1, wherein buffering at least part of the second portion of the media content item comprises:
  determining, based on the one or more parameters, a buffering quality at which to buffer the at least part of the second portion of the media content item; and
  buffering the at least part of the second portion of the media content item at the buffering quality.

8. The computer-implemented method of claim 1, wherein the one or more users includes a user to whom the first portion and the second portion of the media content item are output.

9. The computer-implemented method of claim 1, wherein at least one parameter included in the one or more parameters is determined using a machine learning model that is trained based on the behavioral data associated with the one or more users.

10. One or more non-transitory computer-readable media storing instructions that, when executed by at least one processor, cause the at least one processor to perform the steps of:
  causing a first portion of a media content item to be output via at least one output device;
  buffering at least part of a second portion of the media content item based on one or more parameters that indicate an amount versus a quality of the at least part of the second portion of the media content item to buffer, wherein the one or more parameters are determined based on behavioral data associated with one or more users;
  causing a description of a playback option to be output via the at least one output device; and
  in response to not receiving a user selection of the playback option, causing the at least part of the second portion of the media content item to be output via the at least one output device.

11. The one or more non-transitory computer-readable media of claim 10, wherein the instructions, when executed by the at least one processor, further cause the at least one processor to, in response to receiving a user selection of the playback option, cause the at least part of the second portion of the media content item to not be output via the at least one output device.

12. The one or more non-transitory computer-readable media of claim 10, wherein the description of the playback option is output simultaneously with at least part of the first portion of the media content.

13. The one or more non-transitory computer-readable media of claim 10, wherein the instructions, when executed by the at least one processor, further cause the at least one processor to cause a countdown timer to be output via the at least one output device while the first portion of the media content item is output via the at least one output device.

14. The one or more non-transitory computer-readable media of claim 10, wherein the at least part of the second portion of the media content item is caused to be output in response to a user selection of the playback option not being received within a predefined amount of time.

15. The one or more non-transitory computer-readable media of claim 10, wherein the one or more parameters include at least one parameter associated with at least one of a device resource or a network resource.

16. The one or more non-transitory computer-readable media of claim 10, wherein buffering of the at least part of a second portion of the media content item is initiated when a user begins interacting with the first portion of a media content item.

17. The one or more non-transitory computer-readable media of claim 10, wherein the one or more parameters are determined by optimizing an objective function.

18. The one or more non-transitory computer-readable media of claim 10, wherein the one or more users includes (i) a user to whom the first portion and the second portion of the media content item are output, and (ii) at least one other user.

19. A system, comprising:
  one or more memories storing instructions; and
  one or more processors that are coupled to the one or more memories and, when executing the instructions, are configured to:
    cause a first portion of a media content item to be output via at least one output device,
    buffer at least part of a second portion of the media content item based on one or more parameters that indicate an amount versus a quality of the at least part of the second portion of the media content item to buffer, wherein the one or more parameters are determined based on behavioral data associated with one or more users,
    cause a description of a playback option to be output via the at least one output device, and
    in response to not receiving a user selection of the playback option, cause the at least part of the second portion of the media content item to be output via the at least one output device.

* * * * *